United States Patent
Naito

(10) Patent No.: US 10,863,040 B2
(45) Date of Patent: Dec. 8, 2020

(54) IMAGE READER, METHOD FOR SETTING DESTINATION INFORMATION, AND STORAGE MEDIUM

(71) Applicant: CANON KABUSHIKI KAISHA, Tokyo (JP)

(72) Inventor: Yosui Naito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/218,318

(22) Filed: Dec. 12, 2018

(65) Prior Publication Data

US 2019/0191038 A1 Jun. 20, 2019

(30) Foreign Application Priority Data

Dec. 19, 2017 (JP) ................................ 2017-242958

(51) Int. Cl.
*H04N 1/00* (2006.01)
*G06K 9/34* (2006.01)
*G06K 9/00* (2006.01)
*H04N 1/44* (2006.01)

(52) U.S. Cl.
CPC ..... *H04N 1/00228* (2013.01); *G06K 9/00449* (2013.01); *G06K 9/00463* (2013.01); *G06K 9/344* (2013.01); *H04N 1/00013* (2013.01); *H04N 1/4406* (2013.01); *G06K 2209/01* (2013.01)

(58) Field of Classification Search
CPC combination set(s) only.
See application file for complete search history.

(56) References Cited

U.S. PATENT DOCUMENTS

| | | | |
|---|---|---|---|
| 2008/0052710 A1* | 2/2008 | Iwai ...................... | G06F 21/305 718/100 |
| 2011/0271324 A1* | 11/2011 | Ikeda .................... | H04L 67/306 726/3 |
| 2012/0198007 A1* | 8/2012 | Fujiwara ................ | H04L 51/28 709/206 |
| 2014/0126825 A1* | 5/2014 | Luo ........................ | G06Q 10/10 382/190 |
| 2016/0295033 A1* | 10/2016 | Hirasawa ............. | H04N 1/0097 |

FOREIGN PATENT DOCUMENTS

JP 2006-333041 A 12/2006

\* cited by examiner

*Primary Examiner* — Helen Zong
(74) *Attorney, Agent, or Firm* — Canon U.S.A., Inc. IP Division

(57) ABSTRACT

In a multi-function peripheral (MFP), in some instances, the use of various data transmission functions, such as e-mail or fax, can be prohibited. In such circumstances, acquiring destination information from a business card by optical character recognition and registering the destination information in a list of the MFP's transmission destinations or in an address book can cause an error and force a user to perform additional operations. Based on device settings and user authentication settings, destinations under a disabled protocol are set in a non-display state in advance at the time of display of optical character recognition results.

13 Claims, 32 Drawing Sheets

FIG. 3A

| 300 | FAX FUNCTION DISPLAY | ON/OFF |
|---|---|---|
| 301 | FAX DISPLAY IN UNIVERSAL TRANSMISSION FUNCTION * SELECTABLE ONLY WHEN THE MENU IS ON | ON/OFF |
| 302 | LIMITATION ON NEW DESTINATION (E-MAIL) | ON/OFF |
| 303 | LIMITATION ON NEW DESTINATION (FAX) | ON/OFF |
| 304 | LIMITATION OF E-MAIL TRANSMISSION TO USER HIMSELF/HERSELF | ON/OFF |

FIG. 3B

| 314 | USER ACCESS MANAGEMENT SETTINGS | | ON/OFF |
|---|---|---|---|
| 310 | | LIMITATION ON E-MAIL TRANSMISSION | ON/OFF |
| 311 | | LIMITATION ON FAX TRANSMISSION | ON/OFF |
| 312 | | LIMITATION OF TRANSMISSION TO NEW DESTINATIONS | ON/OFF |

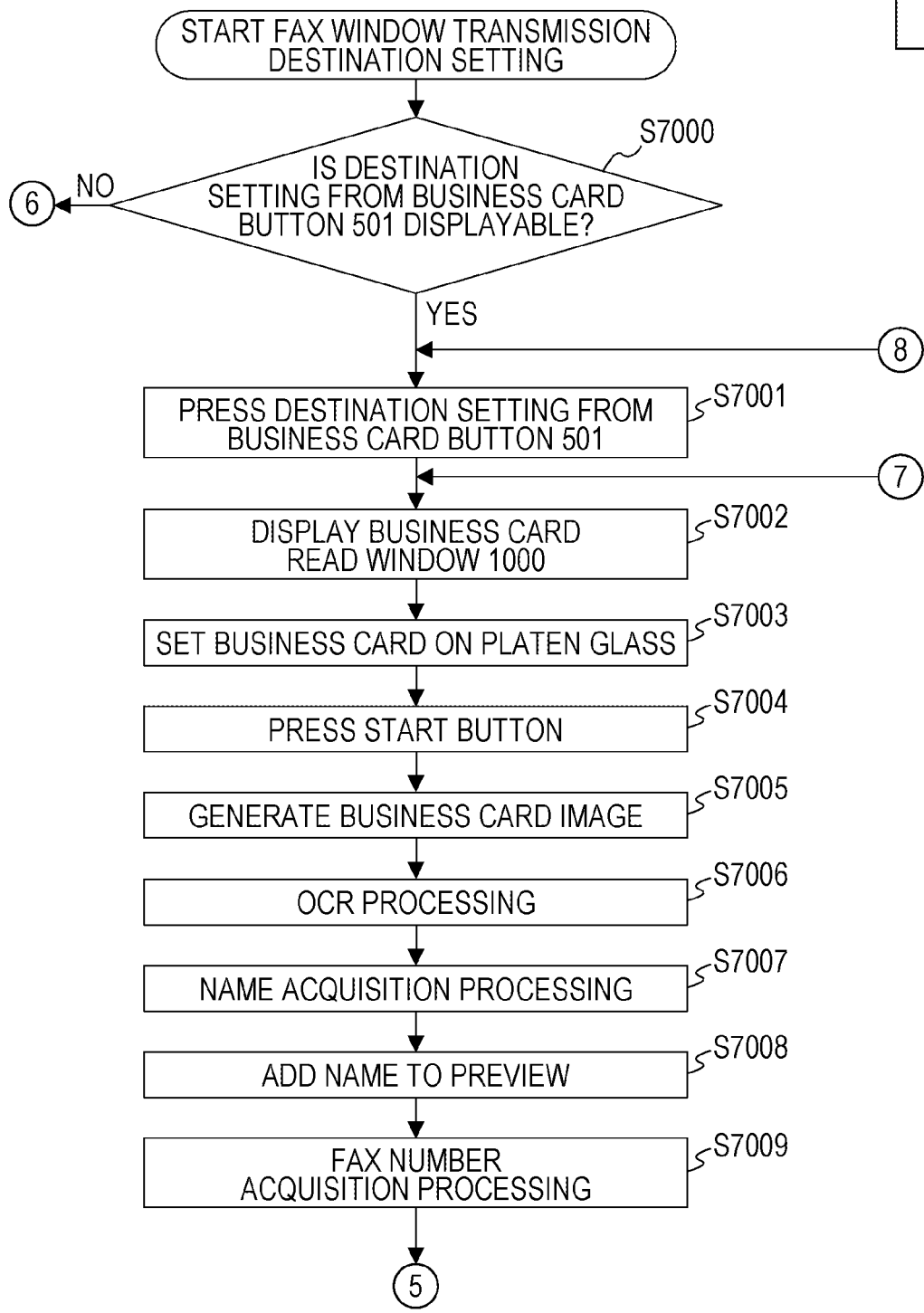

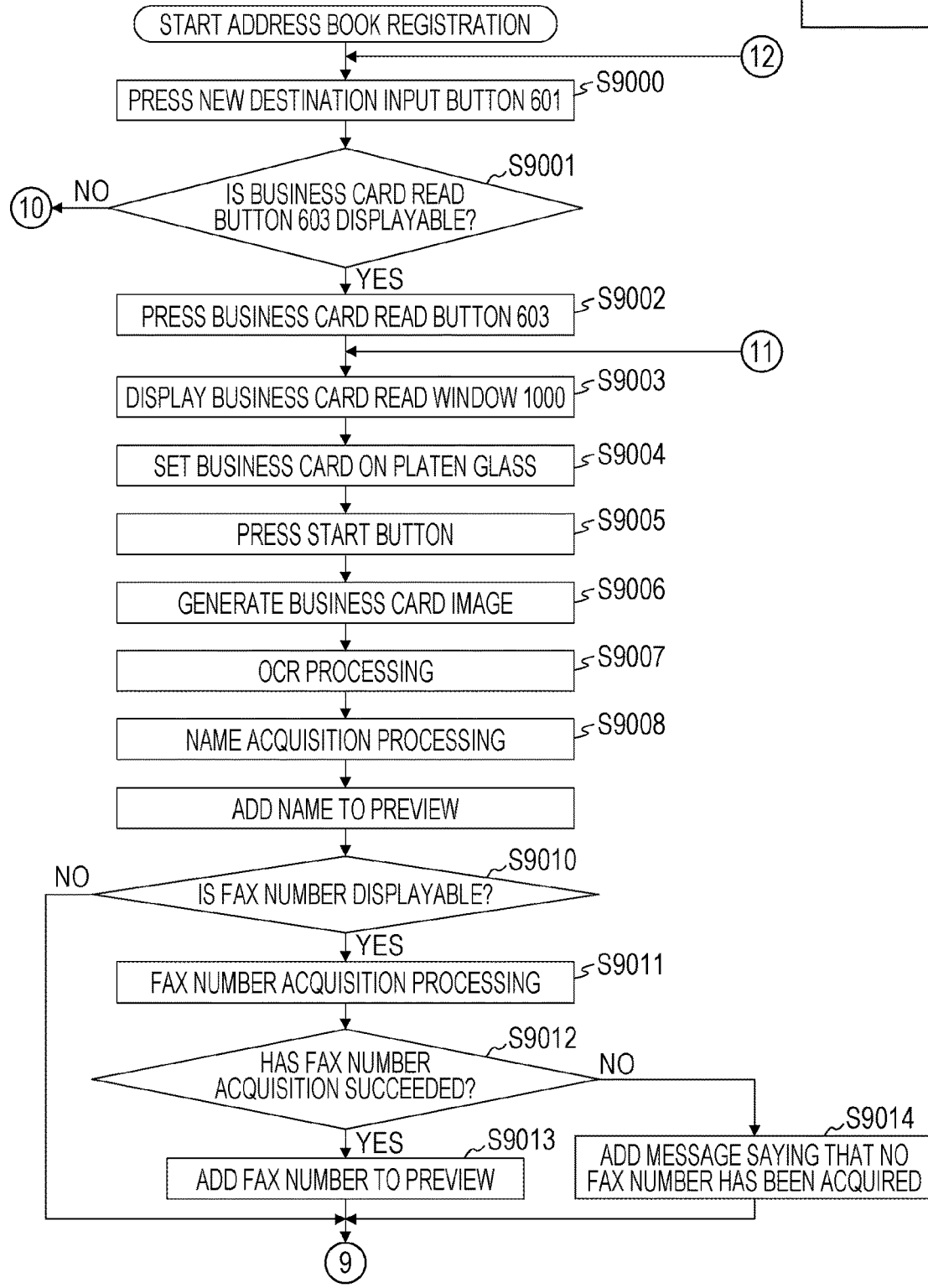

IMAGE READER, METHOD FOR SETTING DESTINATION INFORMATION, AND STORAGE MEDIUM

BACKGROUND

Field

The present disclosure relates to an image reader that reads a business card and sets obtained destination information, a method for setting the destination information, and a storage medium.

Description of the Related Art

Japanese Patent Laid-Open No. 2006-333041 describes a related art for using destination information in a business card by a multifunction peripheral (MFP). In this case, the destination information read from a business card is used as a destination in a transmission function of the MFP. The business card is scanned and subjected to optical character recognition (OCR) processing by the MFP and the acquired destination information is displayed on a control panel of the MFP. The user confirms and sets the destination information as a transmission destination.

According to the related art, the destination information used at this time is a telephone number for facsimile when the device is operating as a facsimile and is an e-mail address when the device is operating as an internet facsimile.

In recent years, MFPs have been generally equipped with a facsimile-dedicated function menu and a universal transmission function menu by which various transmission functions such as facsimile, internet facsimile, and e-mail are available at the same time. In addition, in some MFPs, the display of the facsimile-dedicated functions can be turned on and off and the usage of facsimile in the universal transmission function can be turned on and off by device settings. Some MFPS enable inhibiting transmission to new destinations by a specific transmission function by device settings.

In some MFPs, limitations can be placed on the usable functions for each user by a user access management function. For example, fax transmission or e-mail transmission to specific users can be prohibited.

In this way, in MFPs enabling both fax transmission and e-mail transmission, when the destination information read from a business card is set as a transmission destination in the universal transmission function, both the addresses of facsimile and e-mail are set as transmission destinations.

However, for example, when the usage of new e-mail destinations is prohibited by the device setting, setting the e-mail address causes an error. In addition, for example, when fax transmission by a user is prohibited in the user access management function, the setting of a fax number by the user causes an error SUMMARY The present disclosure relates to an image reader including a reading unit that reads a business card image, a character recognition unit that performs optical character recognition on the read business card image and extracts characters from the business card image, a destination information acquisition unit that acquires destination information in the business card image from the extracted characters, a destination information display unit that displays the acquired destination information, a transmission unit that performs transmission to a destination via a plurality of transmission functions, and a setting unit that sets limitations on availability of individual transmission functions based on a first availability setting for setting the availability of the individual transmission functions based on device settings and a second availability setting for setting the availability of the individual transmission functions for an authenticated user. Information on the individual transmission functions limited by the setting unit are set to a non-display state.

Further features will become apparent from the following description of exemplary embodiments with reference to the attached drawings.

BRIEF DESCRIPTION OF THE DRAWINGS

FIGS. 3A and 3B are diagrams illustrating some of setting items of a transmission function of the MFP.

FIGS. 7A and 7B are a flowchart of the registration of a destination from a business card in the fax function.

FIGS. 9A and 9B are a flowchart of the registration of a destination from a business card in the address book.

DESCRIPTION OF THE EMBODIMENTS

Exemplary embodiments for carrying out the present disclosure will be described below with reference to the drawings.

<Hardware Configuration of an MFP 100>

Figure 1:
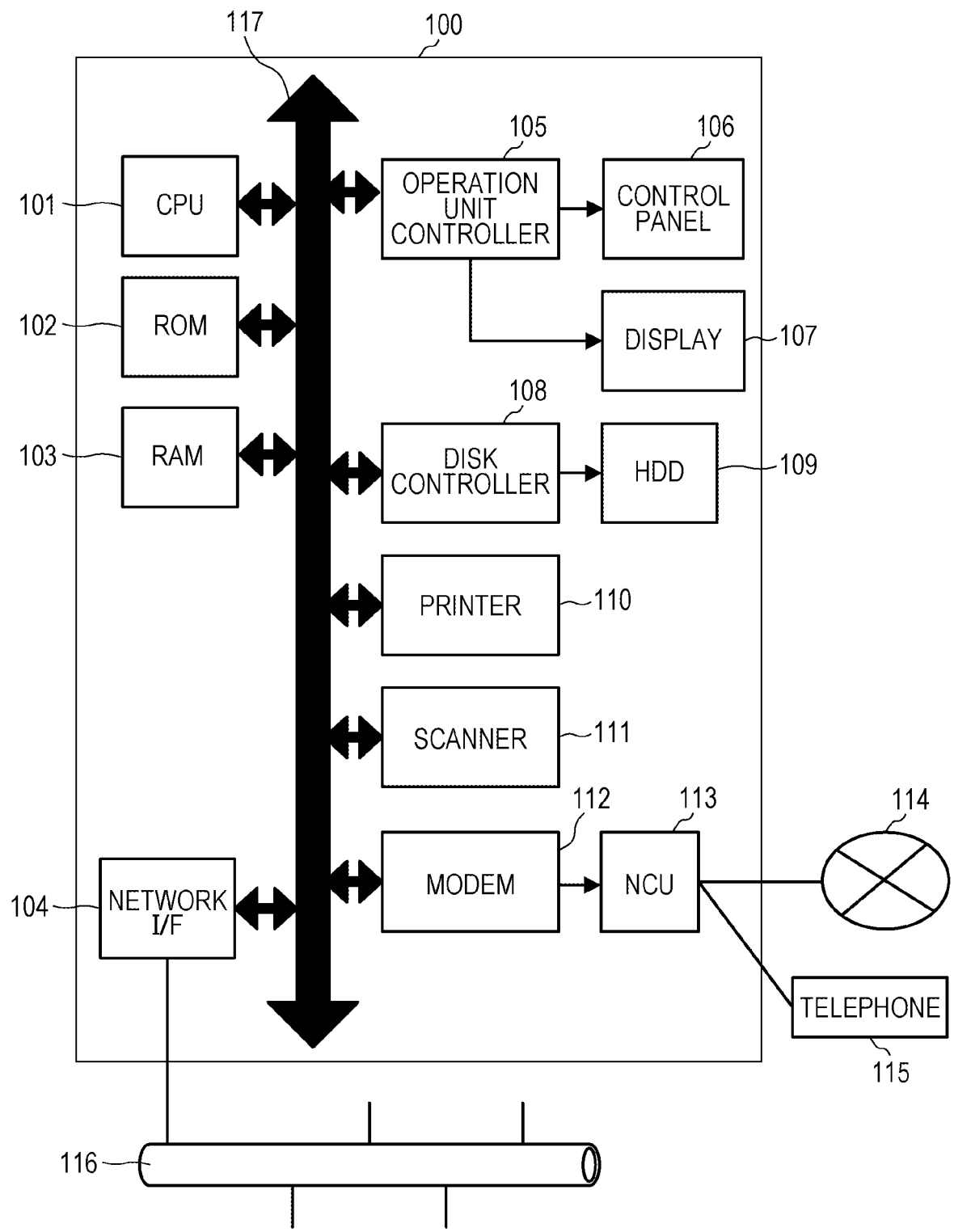
FIG. 1 is a block diagram of a hardware configuration of an MFP.

FIG. 1 illustrates an internal configuration of the MFP 100.

Referring to FIG. 1, the MFP 100 includes a CPU 101 that executes software stored in a ROM 102, a hard disk drive (HDD) 109, and others. The CPU 101 collectively controls the devices connected to a system bus 117. The HDD 109 may be used as a temporal storage location for images in some cases.

The RAM 103 acts as a main memory and a work area for the CPU 101. An operation unit controller 105 controls a control panel 106, a display 107, and others through various buttons displayed on these components. A disk controller 108 controls the HDD 109.

A network I/F 104 exchanges data with other network devices and file servers via a network 116.

A printer 110 is a paper printing unit that is implemented by a printing method such as electrophotography. A scanner 111 is an image reader for reading an image printed on paper. In many cases, the scanner 111 includes an auto document feeder (ADF) (not illustrated) as an option that can automatically read a plurality of original documents.

A MODEM 112 demodulates a modulated signal from a telephone line 114 and, in reverse, modulates a signal from a device and sends the same to the telephone line 114. A network control unit (NCU) 113 corresponds to an interface between the telephone line 114 and a facsimile. The NCU 113 performs line control by detecting a signal transmitted from the telephone line 114 and transferring the same to the MODEM 112, or switching the telephone line 114 to a facsimile or a telephone 115.

<Software Configuration in the Present Example>

Next, a software configuration in the present example will be described with reference to FIG. 2.

Figure 2:
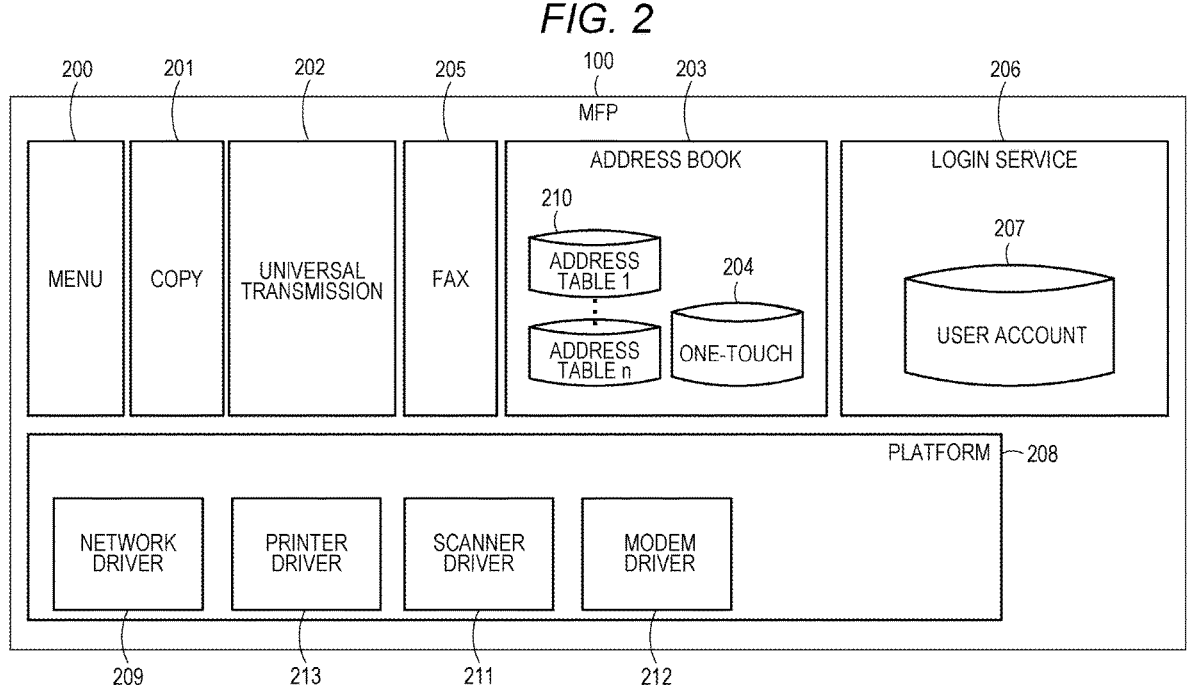
FIG. 2 is a block diagram of a software configuration of the MFP.

FIG. 2 is a block diagram illustrating a software configuration of the MFP 100 and a data area managed by the software.

Destination table 210, one-touch 204, and user account 207 constitute data areas of data recorded and managed by the software in the RAM 103 and the HDD 109.

The destination table 210 and the one-touch 204 will be collectively called address book 203. The address book 203 records destinations. The user account 207 records data such as authority setting and e-mail address for each user account.

A platform 208 includes an operating system such as Linux (registered trademark), a virtual machine such as JAVA (registered trademark), OSGi framework, device driver groups, and others. The OSGi framework is a JAVA-based platform defined by OSGi Alliance (standardizing body).

The platform 208 includes device drivers for controlling various kinds of hardware and provides APIs for using hardware to applications operating on the platform. There exist in the platform 208, a network driver 209 that controls the network I/F control unit 104, a printer driver 213 that controls the printer 110, a scanner driver 211 that controls the scanner 111, a MODEM driver 212 that controls the MODEM 112, and others.

Copy 201, universal transmission 202, and fax 205 are applications operating on the platform 208, and user interfaces for providing these functions are displayed on the display 107. For example, the copy 201 is an application for controlling the scanner 111 and the printer 110 via the platform 208 and executing copying. The universal transmission 202 is an application for performing many kinds of transmission functions such as facsimile transmission/reception, e-mail transmission, and server message block (SMB) transmission. The universal transmission 202 implements these transmission functions by transmitting document data read via the scanner 111 to the network 116 or the telephone line 114. The fax 205 is an application dedicated to performing facsimile transmission/reception.

Both the universal transmission 202 and the fax 205 are applications in which newly input destinations and the destinations saved in the address book 203 can be used as destinations for transmission.

Menu 200 is a module that displays a menu for selection of an application from the display 107. Login service 206 is a module that provides a login function for using the MFP 100.

<Descriptions of the Menu Window>

Figure 10:
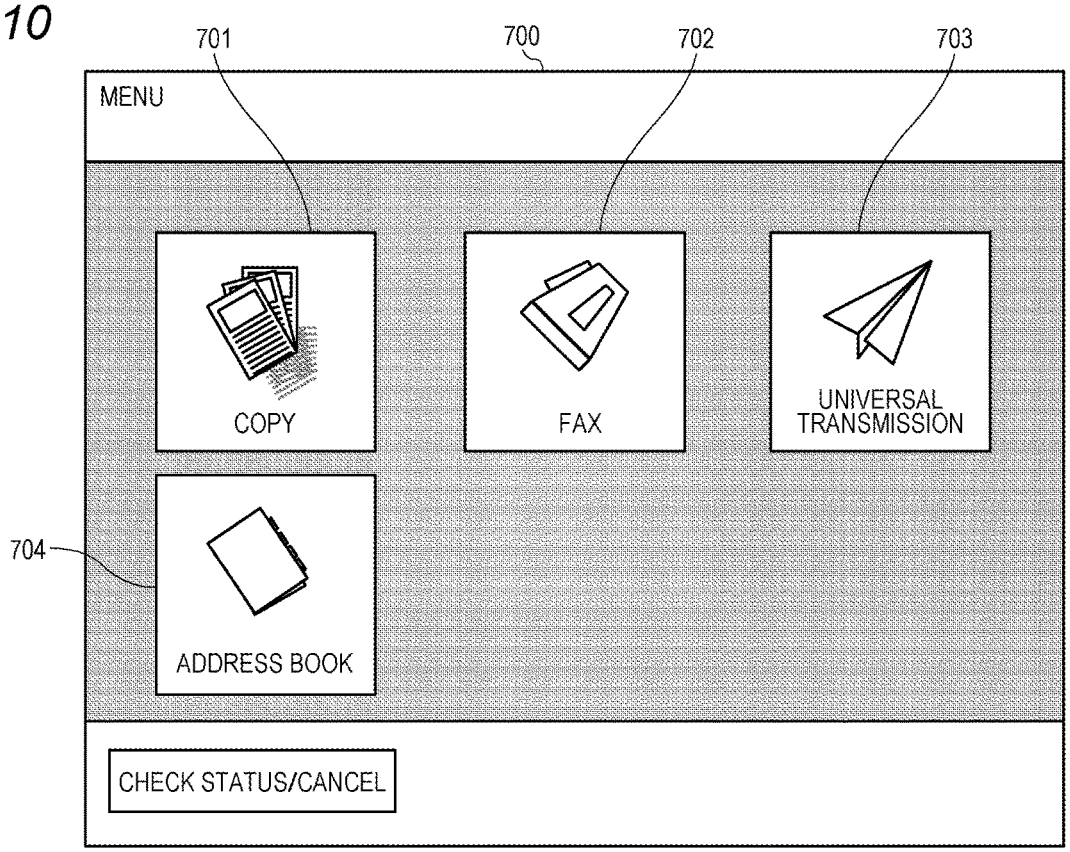
FIG. 10 is a diagram illustrating a menu window.

FIG. 10 is a menu window 700 for display of the menu 200. The menu window 700 contains buttons for calling the applications.

A copy button 701 is an icon for calling the copy 201.

A fax button 702 is an icon for calling the fax 205.

A universal transmission button 703 is an icon for calling the universal transmission 202.

An address book button 704 is an icon for calling the address book 203.

<Device Settings for Transmission Function>

FIG. 3A illustrates an example of settings related to universal transmission and fax transmission.

An item 300 is for setting whether to display the fax 205 in the menu window 700. When the item 300 is ON, the fax button 702 is displayed in the menu window 700 illustrated in FIG. 10 to enable the use of the fax 205. When the item 300 is OFF, the fax button 702 is not displayed in the menu window 700. Instead, the fax function is displayed in the universal transmission 202 (in a universal transmission window 400 illustrated in FIG. 4A described later).

An item 301 is selectable only when the setting of the fax function display in the item 300 is ON. When the item 301 is set to ON, the fax function is displayed in the universal transmission 202. When the item 301 is set to OFF, the fax function is not displayed in the universal transmission 202.

An item 302 is a setting for prohibiting new e-mail destinations. When the item 302 is set to ON, the use of new e-mail destinations is disabled regardless of the limitation on the transmission to new destinations in the user access management settings in an item 312 described later.

An item 303 is a setting for prohibiting new fax destinations. Similarly, when the item 303 is set to ON, the use of new fax destinations is disabled regardless of the limitation on the transmission to new destinations in the user access management settings in the item 312.

An item 304 is a setting for limiting e-mail transmission to only a mail address associated with a logged-in user.

FIG. 3B illustrates an example of user access management settings in universal transmission and fax transmission. An item 314 is an ON/OFF setting of the user access management settings. Only when this item is set to ON, the settings from the items 310 to 312 are enabled.

An item 310 is a setting for prohibiting e-mail transmission.

An item 311 is a setting for prohibiting fax transmission.

An item 312 is a setting for prohibiting transmission to new destinations in all the transmission functions. The user with the item 312 in ON can perform transmission to only the destinations registered in the address book 203.

The settings described in FIGS. 3A and 3B can be made by the user with an administrator authority.

First Example

<Screen Flow of Registering a Destination from a Business Card as a Transmission Destination in the Universal Transmission Function>

Next, descriptions will be given as to a process flow and screen display of reading destination information from one business card and registering the same as a transmission destination in the universal transmission 202 with reference to FIGS. 4A to 4D and 5A to 5G.

In a first example, the settings in FIGS. 3A and 3B are as described in Table 1 below. Specifically, the first example is an example in which the logged-in user is A and the user access management settings 314 for the user A is ON.

This series of operations is performed when a program describing the following procedure is read from the ROM 102 to the RAM 103 and then is executed by the CPU 101.

TABLE 1

| (a) Device settings in the first example | |
|---|---|
| Fax function display 300 | ON |
| Fax display in universal transmission function 301 | ON |
| Limitation on new destinations (e-mail) 302 | OFF |
| Limitation on new destinations (fax) 303 | OFF |
| Limit e-mail transmission to user himself/herself 304 | OFF |

| (b) User access management settings for logged-in user in the first example | |
|---|---|
| | User A |
| Limitation on e-mail transmission 310 | OFF |
| Limitation on fax transmission 311 | ON |
| Limitation on transmission to new destinations 312 | OFF |

Figure 4A:
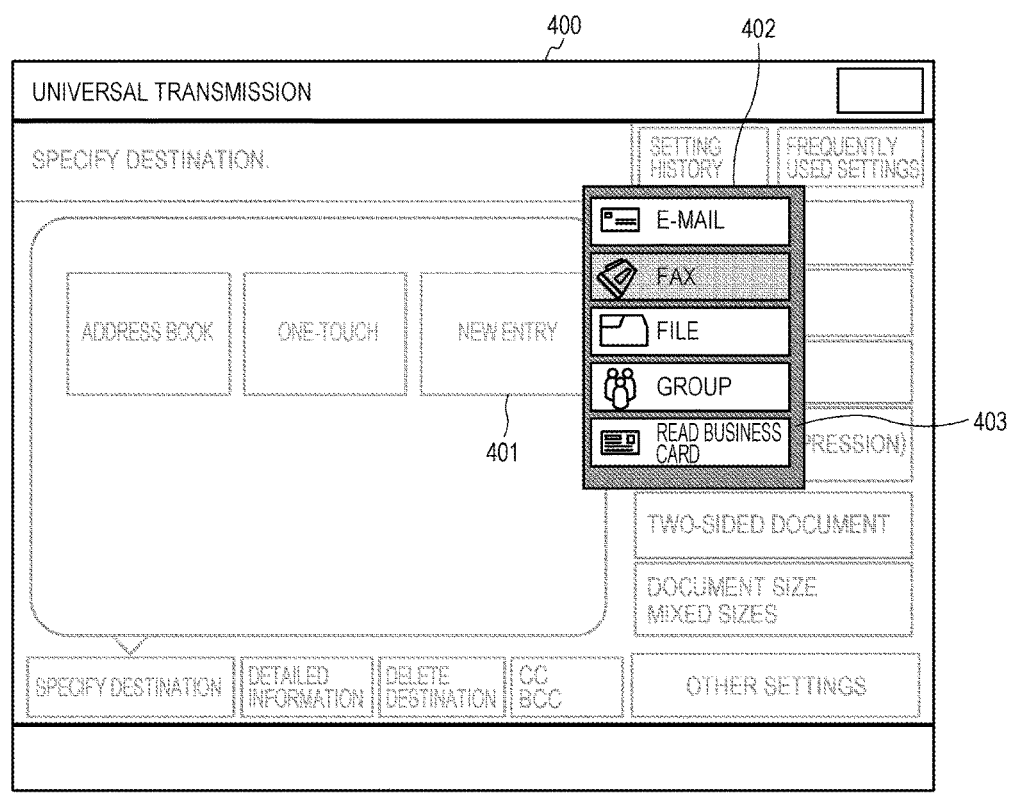
FIGS. 4A and 4B are diagrams describing screen display at the registration of a destination from a business card in a universal transmission function.
Figure 4B:
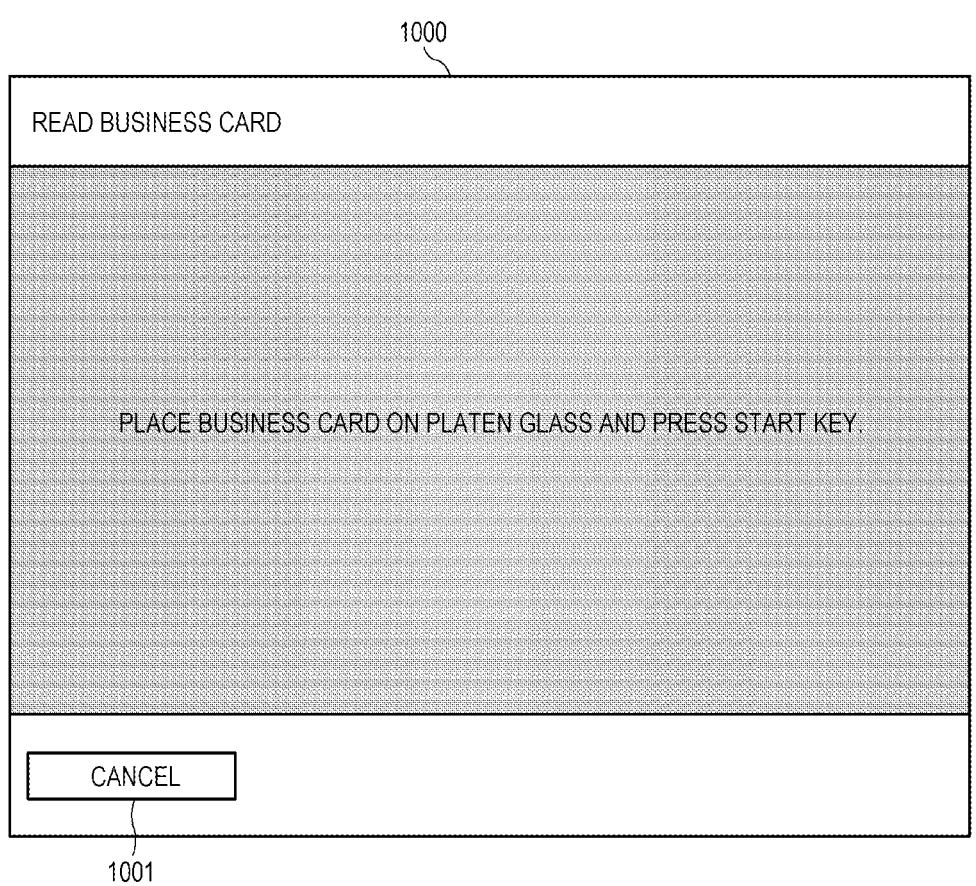

FIG. 4A illustrates a universal transmission window 400. A button 401 is selected to input a new transmission destination. When the button 401 is selected (S5000 in FIG. 5A), a dialog 402 is displayed in which the transmission functions are selectable. The dialog 402 contains buttons 403 for inputting a destination using a business card read result. The display of the dialog 402 is controlled by button display determination processing in S5001.

Next, S5001 will be described in detail with reference to FIG. 5C.

First, when it is not determined in S5100 that a new fax destination is usable, the process moves to S5101.

Figure 5:
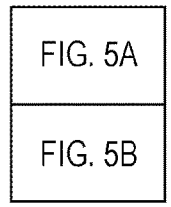
FIGS. 5A and 5B are a flowchart of the registration of a destination from a business card in the universal transmission function.
FIG. 5C is a flowchart of the registration of the destination from the business card in the universal transmission function.
FIG. 5D is a flowchart of the registration of the destination from the business card in the universal transmission function.
FIG. 5E is a flowchart of the registration of the destination from the business card in the universal transmission function.
FIGS. 5F and 5G are flowcharts of the registration of the destination from the business card in the universal transmission function.
Figure 5A:
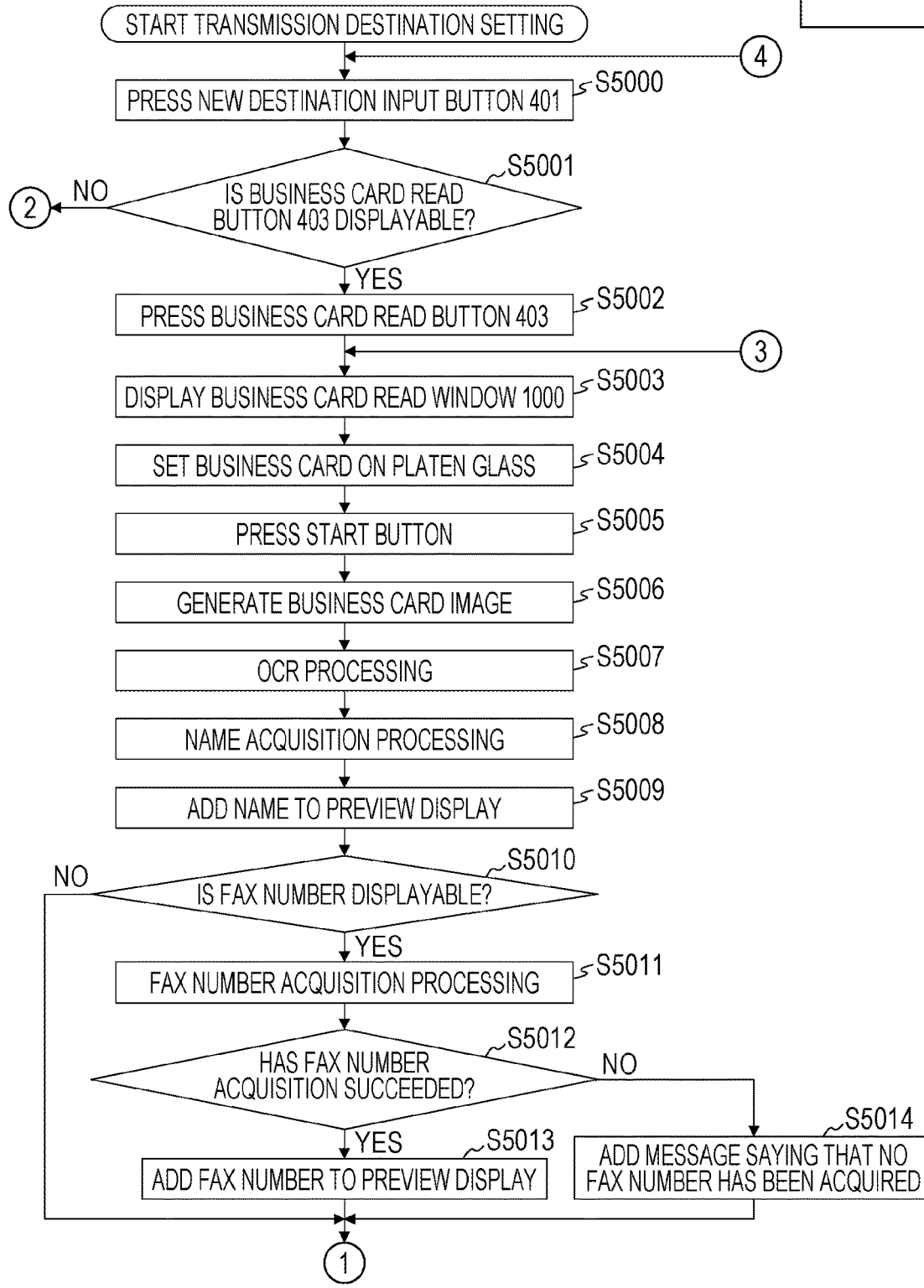
Figure 5B:
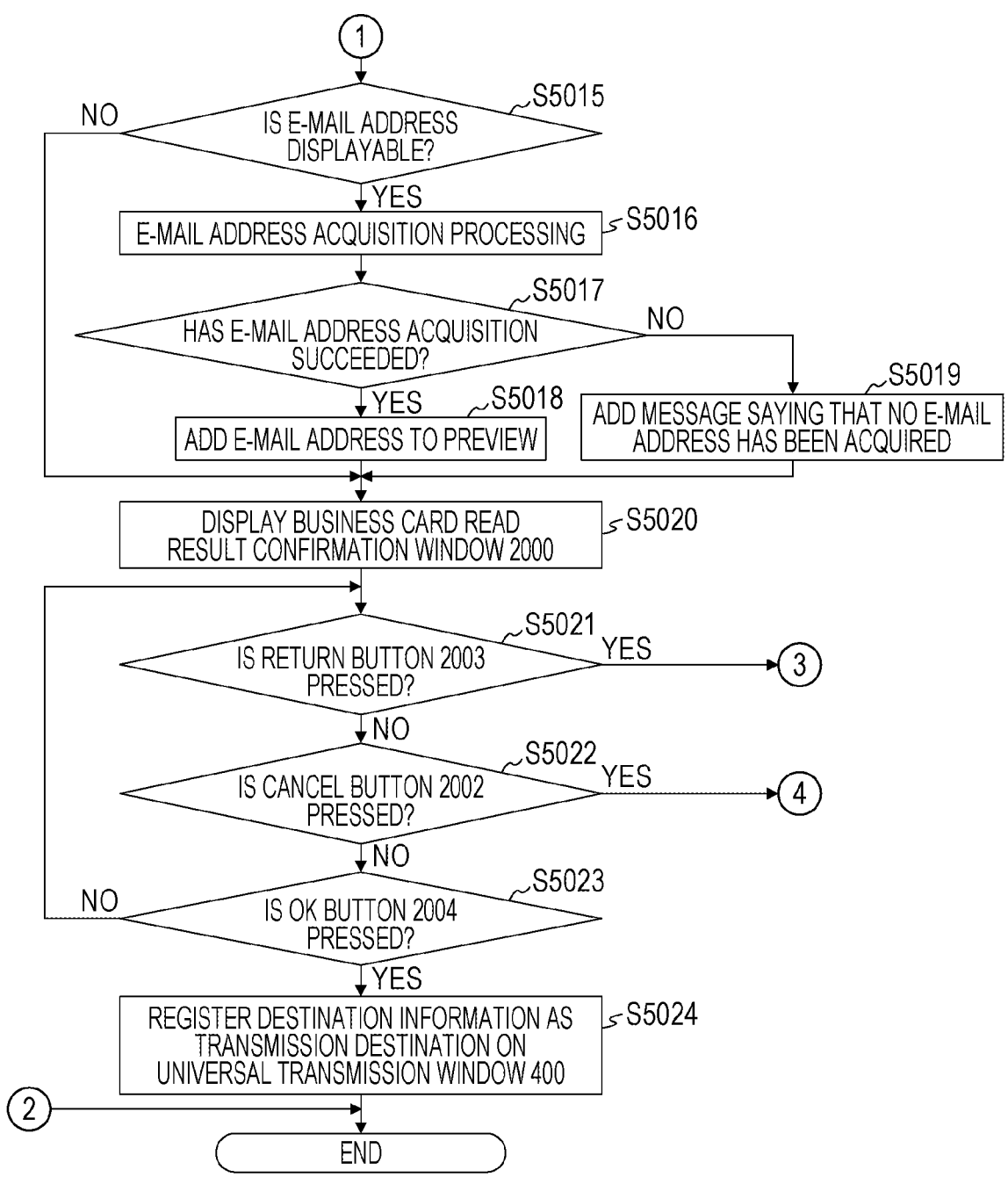

When it is not determined in S5101 that a new e-mail destination is usable, the process moves to No in S5001 described in FIG. 5A to terminate the setting of the transmission destination.

When the determination result is Yes in either S5100 or S5101, the process moves to Yes in S5001 described in FIG. 5A and then moves to S5002. Then, S5100 will be described in detail with reference to FIG. 5D, and S5101 will be described in detail with reference to FIG. 5E.

Figure 5C:
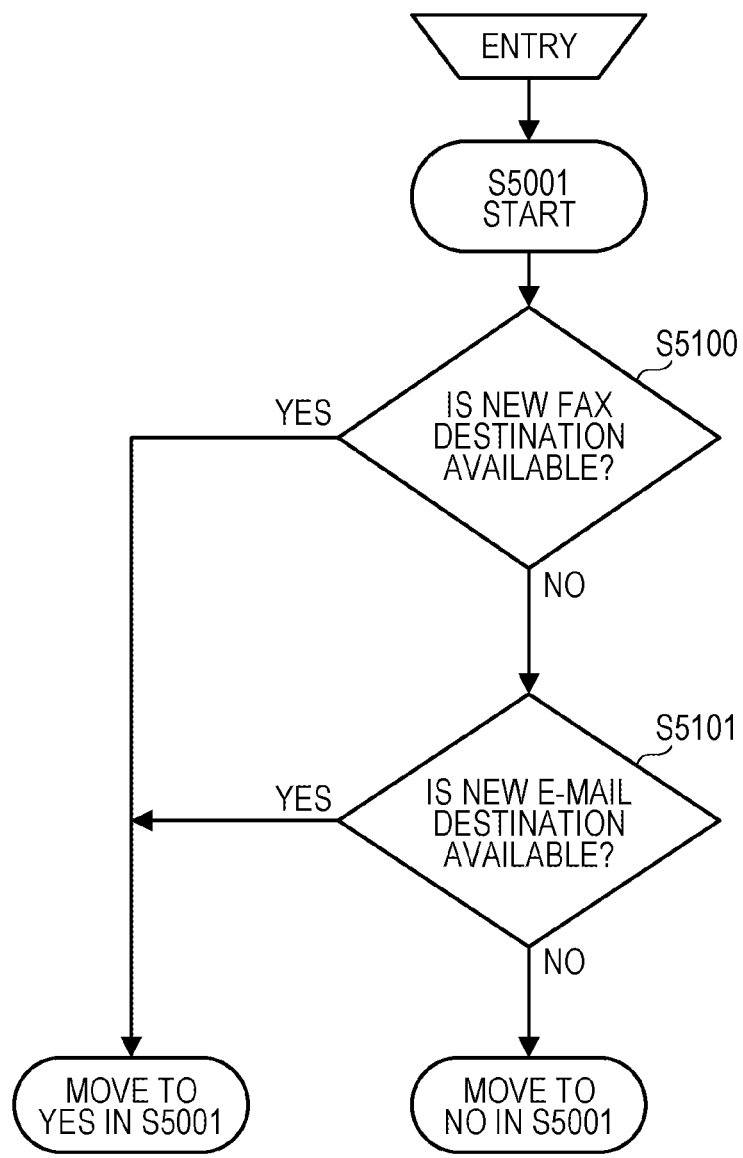
Figure 5D:
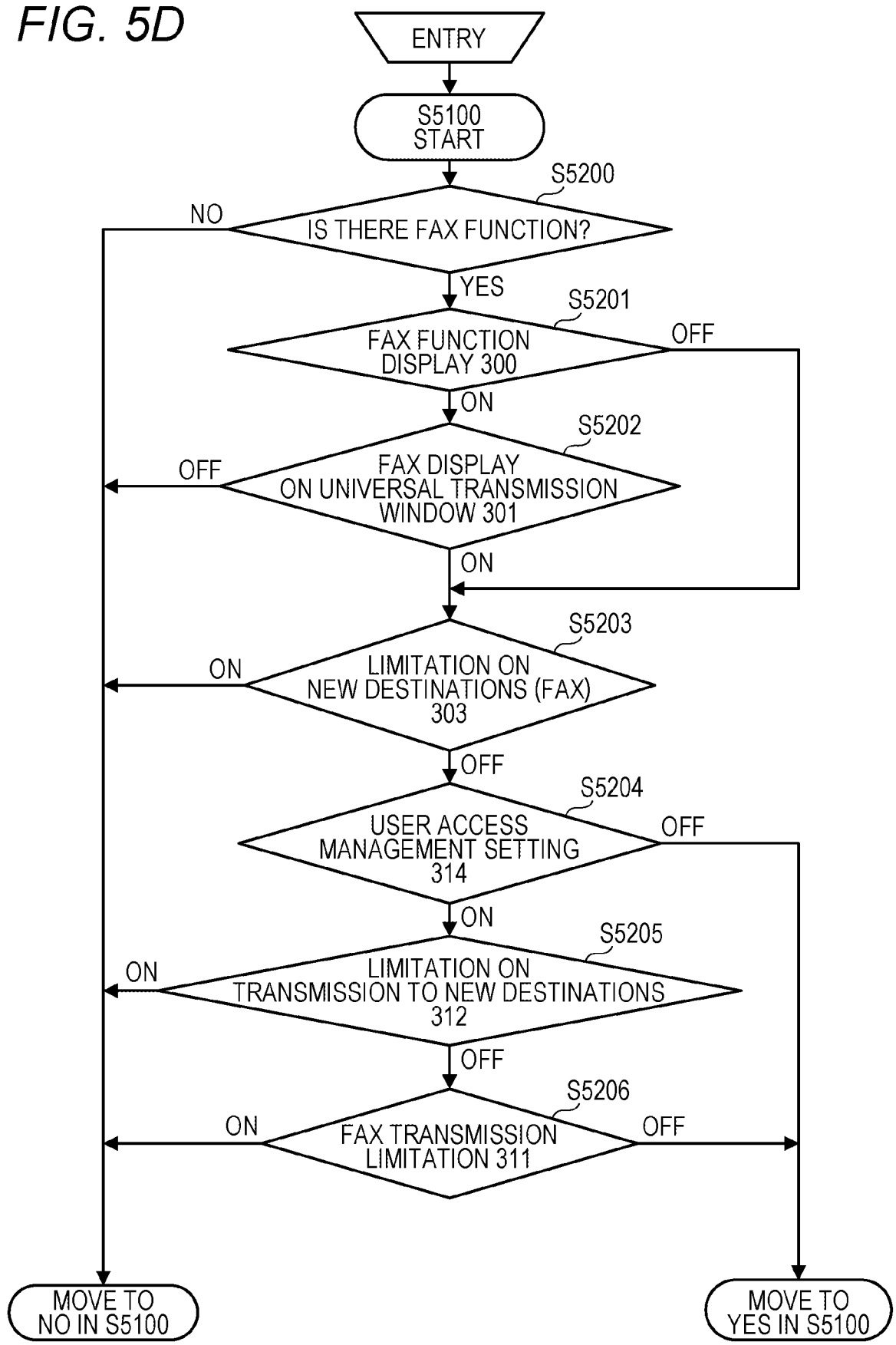

S5100 will be described in detail (FIG. 5D).

First, it is determined whether the MFP 100 has a fax function by checking the presence of the MODEM 112 and the NCU 113 (S5200). This is because the fax function is an option function of the MFP 100 and thus some MFPs have no fax function.

When it is determined in S5200 that the MFP 100 has no fax function, the process moves to No in S5100 described in FIG. 5C. When the MFP 100 has the fax function, the process moves to S5201.

When it is determined in S5201 that the item 300 of the fax function display is OFF, the display of the fax function in the universal transmission window 400 is enabled, and thus the process moves to S5203.

When it is determined in S5201 that the item 300 is ON, the process moves to S5202.

In S5202, the value of the item 301 of the fax display in the universal transmission window is checked. When it is determined in S5202 that the item 301 is ON, the process moves to S5203. When it is determined that the item 301 is OFF, the process moves to No in S5100 described in FIG. 5C.

When it is determined in S5203 that the value of the item 303 of limitation on new destinations (fax) is ON, the process moves to No described in FIG. 5C. When the item 303 is OFF, the process moves to S5204.

When it is determined in S5204 that the item 314 of the user access management setting is OFF, the process moves to Yes in S5100 described in FIG. 5C. When the item 314 is ON, the process moves to S5205.

When it is determined in S5205 that the item 312 of the limitation on transmission to new destinations under the item 314 of the user access management settings is ON, the process moves to No in S5100 described in FIG. 5C. When the item 312 of the limitation on transmission to new destinations is OFF, the process further moves to S5206.

When it is determined in S5206 that the item 311 of the limitation on fax transmission under the item 314 of the user access management settings is OFF, the process moves to Yes in S5100 described in FIG. 5C. When the item 311 of the limitation on fax transmission is ON, the process moves to No in S5100 described in FIG. 5C.

Figure 5E:
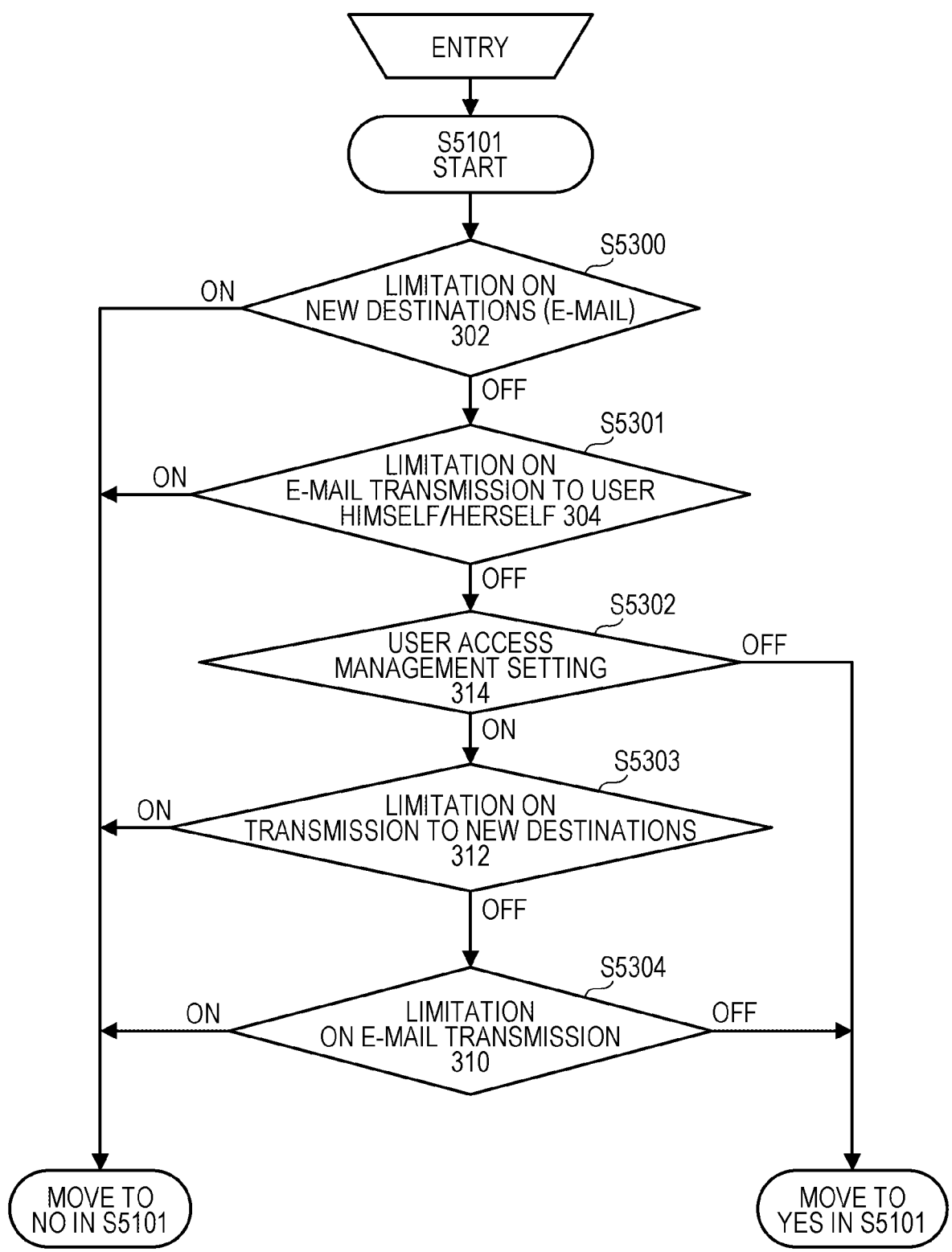
Figure 5F:
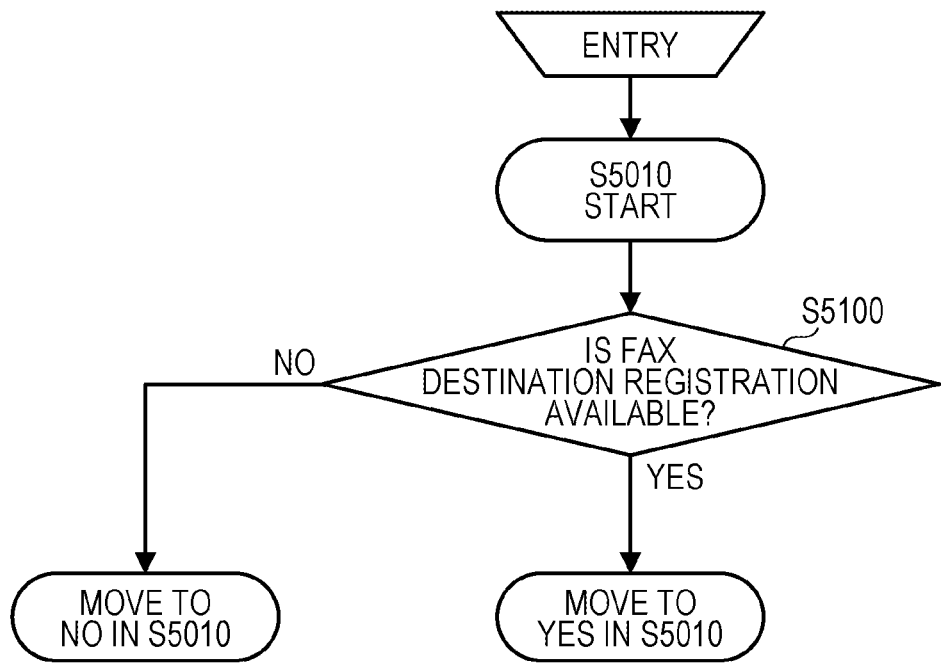

Next, S5101 will be described in detail (FIG. 5E).

First, when it is determined in S5300 that the value of the item 302 of limitation on new destinations (e-mail) is ON, the process moves to No in S5101 described in FIG. 5C. When the item 302 is OFF, the process moves to S5301.

When it is determined in S5301 that the value of the item 304 of limitation on e-mail transmission to the user himself/herself is ON, the process moves to No in S5101 described in FIG. 5C. When the item 304 is OFF, the process moves to S5302.

When it is determined in S5302 that the value of the item 314 of the user access management setting is OFF, the process moves to Yes in S5101 described in FIG. 5C. When the item 314 is ON, the process moves to S5303.

When it is determined in S5303 that the value of the item 312 of limitation on transmission to new destinations under the item 314 of the user access management settings is ON, the process moves to No in S5101 described in FIG. 5C. When the item 312 is OFF, the process moves to S5304.

When it is determined in S5304 that the item 310 under the item 314 of the user access management setting is OFF, the process moves to Yes in S5101 described in FIG. 5C. When the item 310 is ON, the process moves to No in S5101 described in FIG. 5C.

In the present example, the limitation on fax transmission 311 for the user A is ON, fax is not available. However, since all the limitations on e-mail are OFF, the determination result is Yes in S5001 described in FIG. 5A (display enabled), and the business card read button 403 (FIG. 4A) is displayed in a usable state.

Next, when the selection of the business card read button 403 is detected in S5002 described in FIG. 5A, the process moves to S5003.

In S5003, a business card read window 1000 is displayed.

The business card read window 1000 (FIG. 4B) contains a cancel button 1001. When the cancel button 1001 is selected, the screen is returned to the universal transmission window 400 (FIG. 4A).

In S5004, while the business card read window 1000 is displayed, a business card is set on a platen glass.

When the selection of a start key (not illustrated) as a hardware key on the control panel 106 is detected in S5005, the scanner 111 starts to read the image.

Next, in S5006, a business card portion is cut out of the read image to generate a business card image. The cut image is displayed in a business card image preview area 2001 in a business card read result confirmation window 2000 (FIG. 6C). When a plurality of business cards is set on the platen glass at the same time, respective images of the business cards are cut out of the read images (multi-cropping) and the cut business card images are individually processed. In the present example, however, one business card is used as described below.

Next, in S5007, the business card image is subjected to OCR processing.

In S5008, name information is acquired from the extracted character information. Since a name is usually displayed in the largest font in a business card, the name is determined and cut according to the font size. In addition, the name may be determined by the number of characters as well. There are no secure criteria for determination of the name portion, and thus a plurality of candidates may be displayed in a pull-down menu.

In S5009, the acquired name information is displayed in a name text area 2006 in the business card read result confirmation window 2000. In addition, the image of the name portion is cut out based on coordinate information extracted in the OCR processing, and the cut image is displayed in an enlarged manner in a name confirmation field 2005 in the business card read result confirmation window 2000. This makes it easy for the user to confirm the OCR result.

Next, in S5010, it is determined whether to display a preview module of a fax number. In S5010, the determination logic in S5100 is used as described in FIG. 5F.

When the determination result is Yes in S5100, the process moves to Yes in S5010 described in FIG. 5A, and when the determination result is No, the process moves to No in S5010 described in FIG. 5A.

In the present example, the limitation on fax transmission 311 for the user A is set to ON, the determination result is No in S5010 and the fax number is not acquired. That is, the fax number is not displayed in the business card read result confirmation window 2000.

The process flow in the case where the determination result is Yes in S5010 will be described.

In this case, in S5011, the fax number is acquired. The fax number is acquired by extracting an area including the term "FAX" (or a character string similar to the term) and a number string from the text information extracted in the OCR processing in S5007.

Then, in S5012, it is determined whether the acquisition of the fax number has succeeded. When the acquisition has succeeded (Yes), the fax number is displayed in a fax number text area (not illustrated in FIG. 4C) in the business card read result confirmation window 2000. Then, the image of the fax number portion is cut out based on coordinate information extracted in the OCR processing, and the cut image is displayed in an enlarged manner in a fax number enlarged preview area (not illustrated in FIG. 4C) in the business card read result confirmation window 2000. When it is determined in S5012 that the acquisition of the fax number has failed, a message to the effect of that (not illustrated in FIG. 4C) is displayed in the business card read result confirmation window 2000.

Next, in S5015, it is determined whether to display a preview module of an e-mail address. In S5015, the determination logic in S5101 is used as described in FIG. 5G. When the determination result is Yes in S5101, the process moves to Yes in S5015 described in FIG. 5B. When the determination result is No, the process moves to No in S5015 described in FIG. 5B.

Figure 5G:
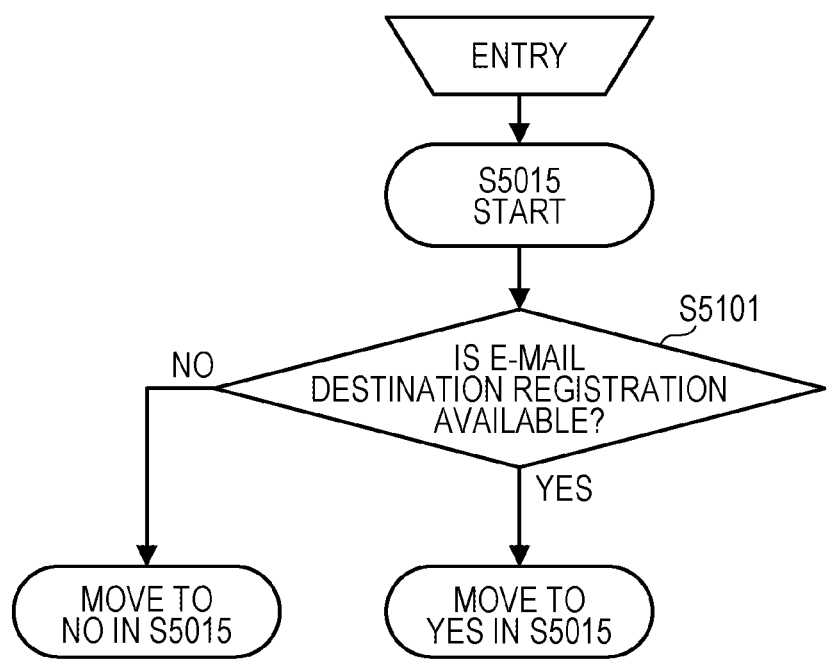

In the present example, since all the limitations on e-mail transmission are set to OFF, and the result of the determination described in FIG. 5G, specifically, S5015 is Yes.

When the determination result is Yes, then the e-mail address is acquired in S5016. In this processing, the e-mail address portion is extracted from the OCR processing result in S5007 on the condition that the portion includes the term "E-mail" (or a character string similar to the term) or a character string with the symbol "@".

Figure 4C:
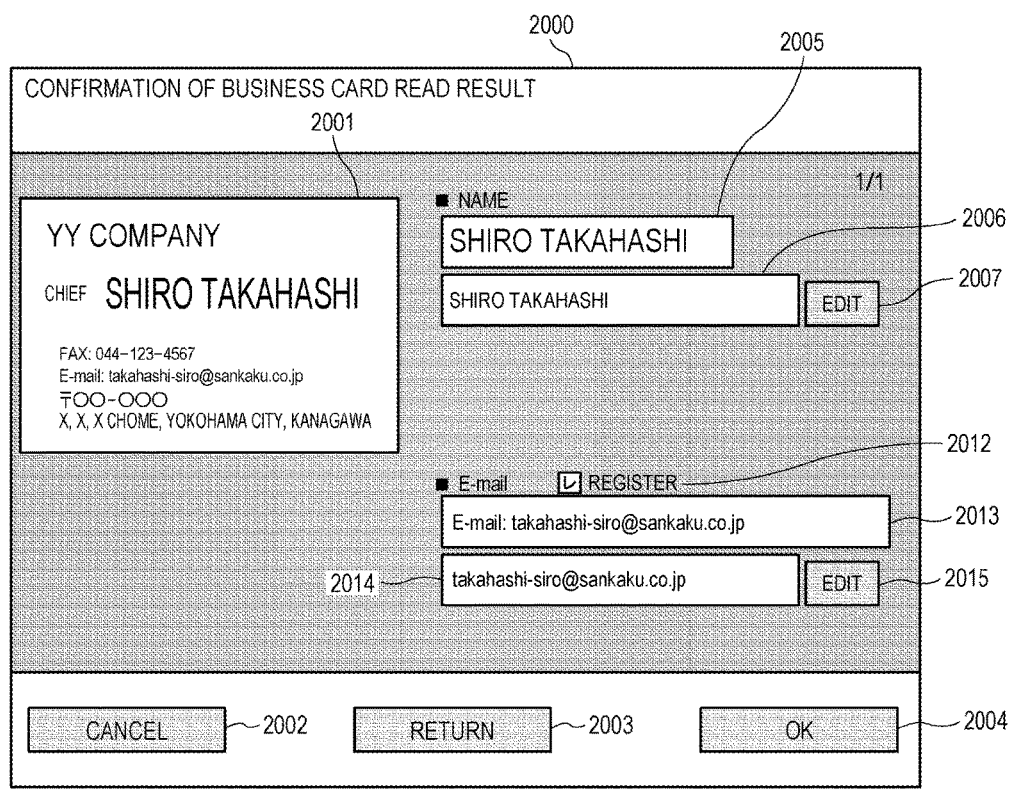
FIGS. 4C and 4D are diagrams describing screen display at the registration of the destination from the business card in the universal transmission function.
Figure 4D:
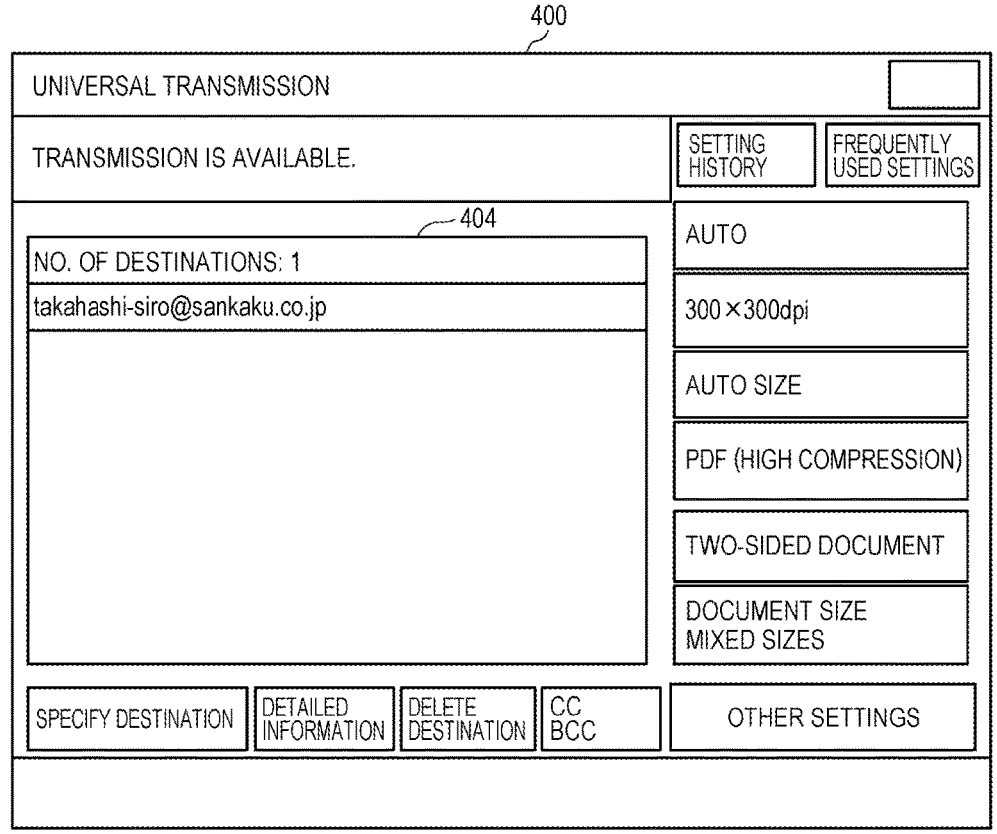

In S5017, it is determined whether the acquisition of the e-mail address has succeeded. When the acquisition has succeeded (Yes), the e-mail address is displayed in an e-mail address text area 2014 in the business card read result confirmation window 2000. Then, the image of the e-mail address portion is cut out based on coordinate information extracted in the OCR processing, and the cut image is displayed in an enlarged manner in an e-mail address enlarged preview area 2013 in the business card read result confirmation window 2000. When it is determined in S5017 that the acquisition of the e-mail address has failed, a message to the effect of that (not illustrated in FIG. 4C is displayed in the business card read result confirmation window 2000 in S5019.

Next, in S5020, processing for displaying the business card read result confirmation window 2000 is performed.

The business card read result confirmation window 2000 contains a name text edit button 2007. When this button is selected, a software keyboard is displayed for the user to edit the text manually. Similarly, the business card read result confirmation window 2000 contains an e-mail address edit button 2015.

In addition, the business card read result confirmation window 2000 contains a check box 2012 to select whether to register the e-mail address as a destination of universal transmission. This check box 2012 is mainly used to, when both the e-mail address and the fax number are to be acquired and displayed, enable selection on whether to use the respective pieces of destination information of the e-mail address and the fax number. Therefore, in the case where only the e-mail address is to be displayed as in the present example, the check box 2012 may not be displayed.

A cancel button 2002 is intended to stop the processing and return to the universal transmission window 400 (Yes in S5022). A return button 2003 is intended to return to the previous window (Yes in S5021). When a plurality of business cards is scanned at the same time, these business cards are displayed one by one in the business card read result confirmation window 2000. Thus, the return button 2003 is used to return to the previous business card for confirmation. In the present example, only one business card is used and thus selecting the return button 2003 returns the screen to the business card read window 1000.

An OK button 2004 is a button for confirmation, which is displayed when the last business card is displayed. When this button is selected (Yes in S5023), the screen returns to the universal transmission window 400 where the destination information selected on the business card read result confirmation window 2000 is displayed in a transmission destination display area 404 (S5024). Upon completion of S5024, the setting of the transmission destination is terminated.

When the destination information is read from the business card and is registered as a destination of universal transmission as described above, unusable destination information is set to non-display state to allow the user to know in advance the unusable functions. This saves the user from having to perform useless operations.

Second Example

<Screen Flow of Registering a Destination from a Business Card as a Transmission Destination in the Fax Function>

Next, descriptions will be given as to a process flow and screen display of reading destination information from one business card and registering the same as a transmission destination in the fax transmission 205 with reference to FIGS. 6A to 6D and 7A to 7C.

In a second example, the settings in FIGS. 3A and 3B are as described in Table 2 below. Specifically, the second example is an example in which the logged-in user is B and the user access management settings 314 for the user B is ON.

As in the first example, this series of operations is performed when a program describing the following procedure is read from the ROM 102 to the RAM 103 and then is executed by the CPU 101.

TABLE 2

(a) Device settings in the second example

| | |
|---|---|
| Fax function display 300 | ON |
| Fax display in universal transmission function 301 | ON |
| Limitation on new destinations (e-mail) 302 | OFF |
| Limitation on new destinations (fax) 303 | OFF |
| Limit e-mail transmission to user himself/herself 304 | OFF |

(b) User access management settings for logged-in user in the second example

| | User B |
|---|---|
| Limitation on e-mail transmission 310 | OFF |
| Limitation on fax transmission 311 | OFF |
| Limitation on transmission to new destinations 312 | OFF |

Figure 6A:
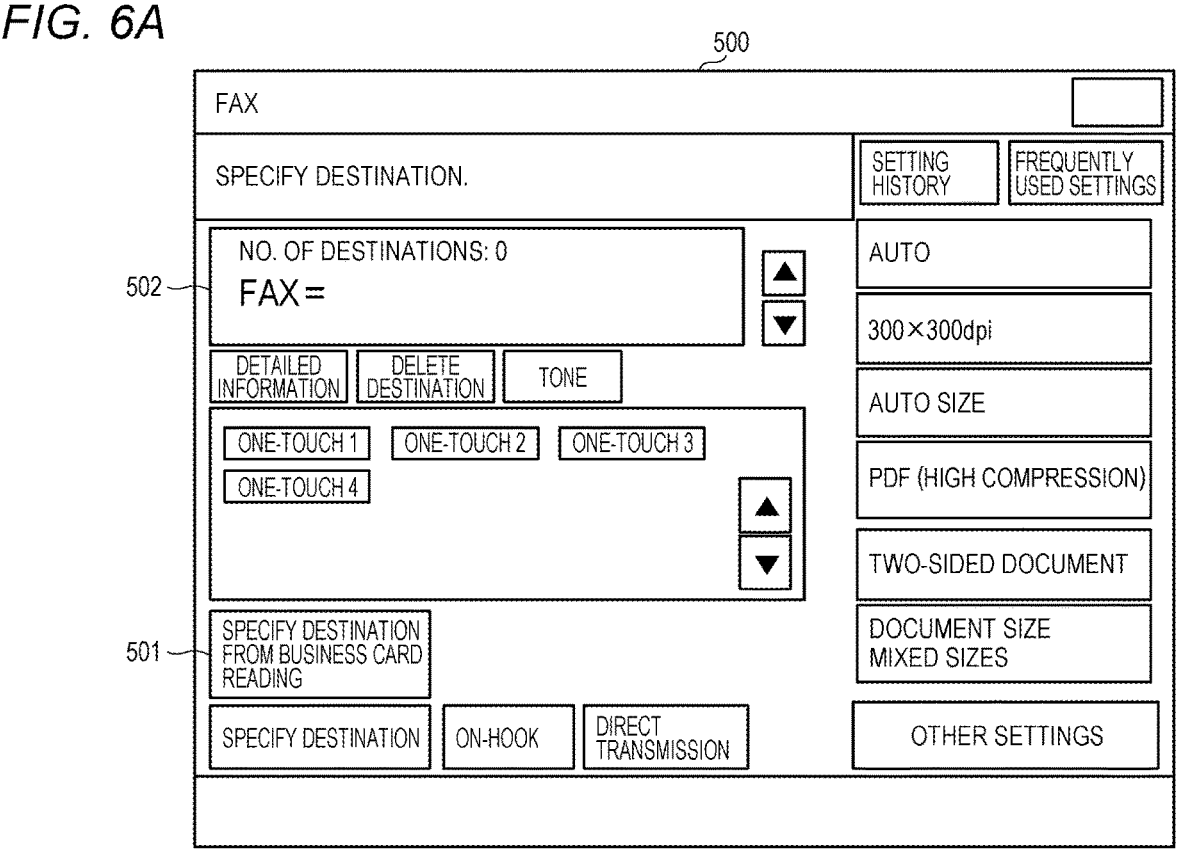
FIGS. 6A and 6B are diagrams describing screen display at the registration of a destination from a business card in a fax function.
Figure 6B:
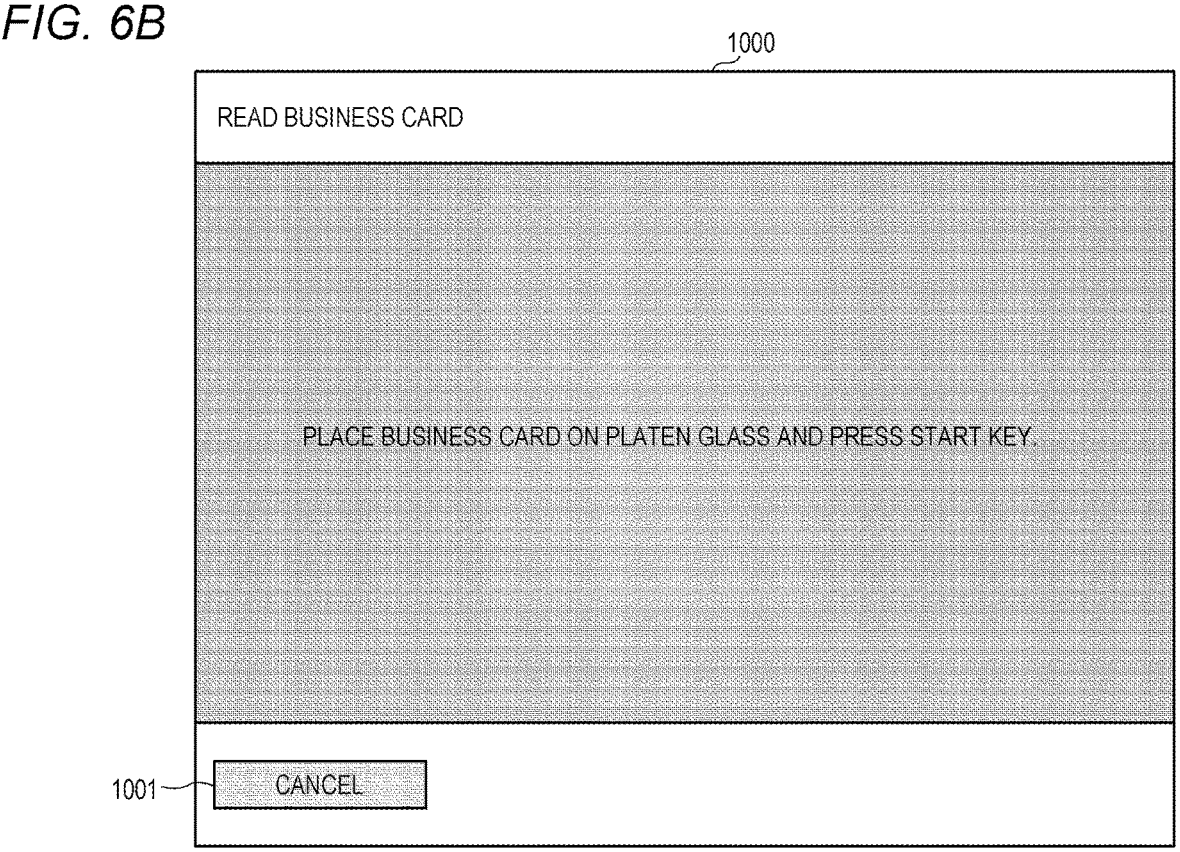
Figure 6C:
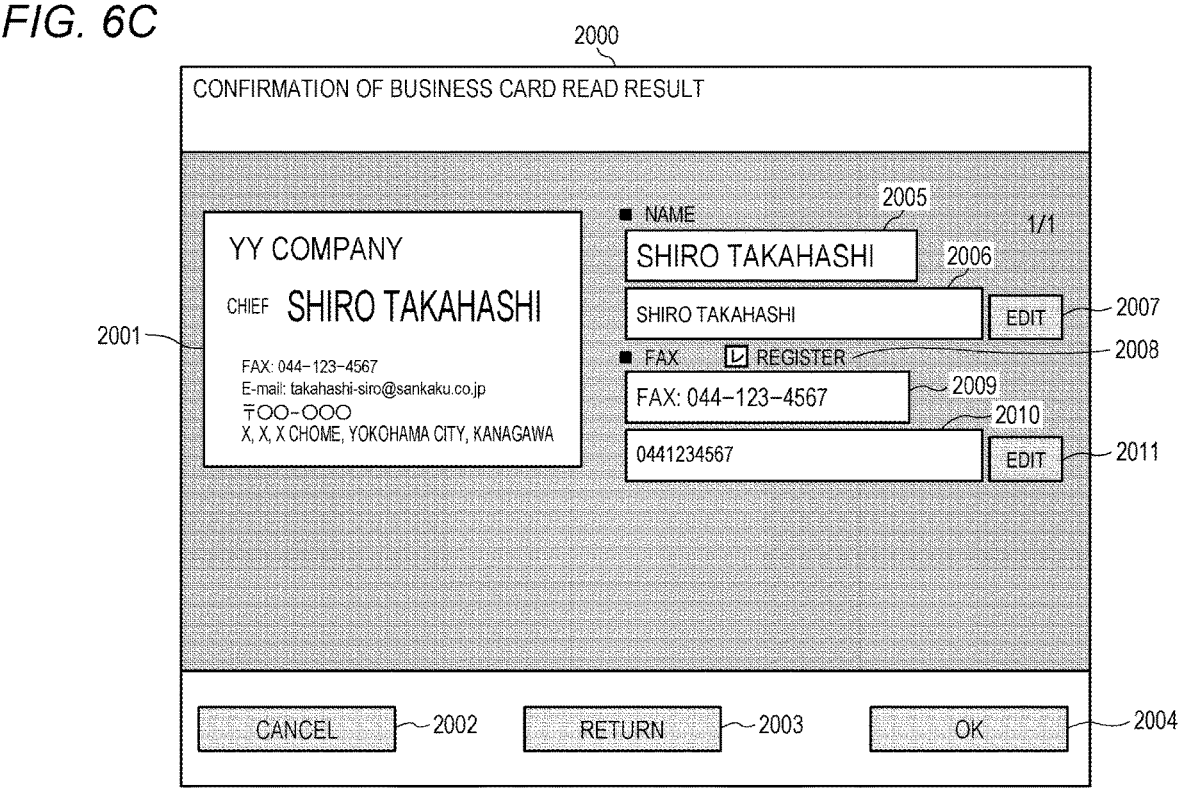
FIGS. 6C and 6D are diagrams describing screen display at the registration of the destination from the business card in the fax function.
Figure 6D:
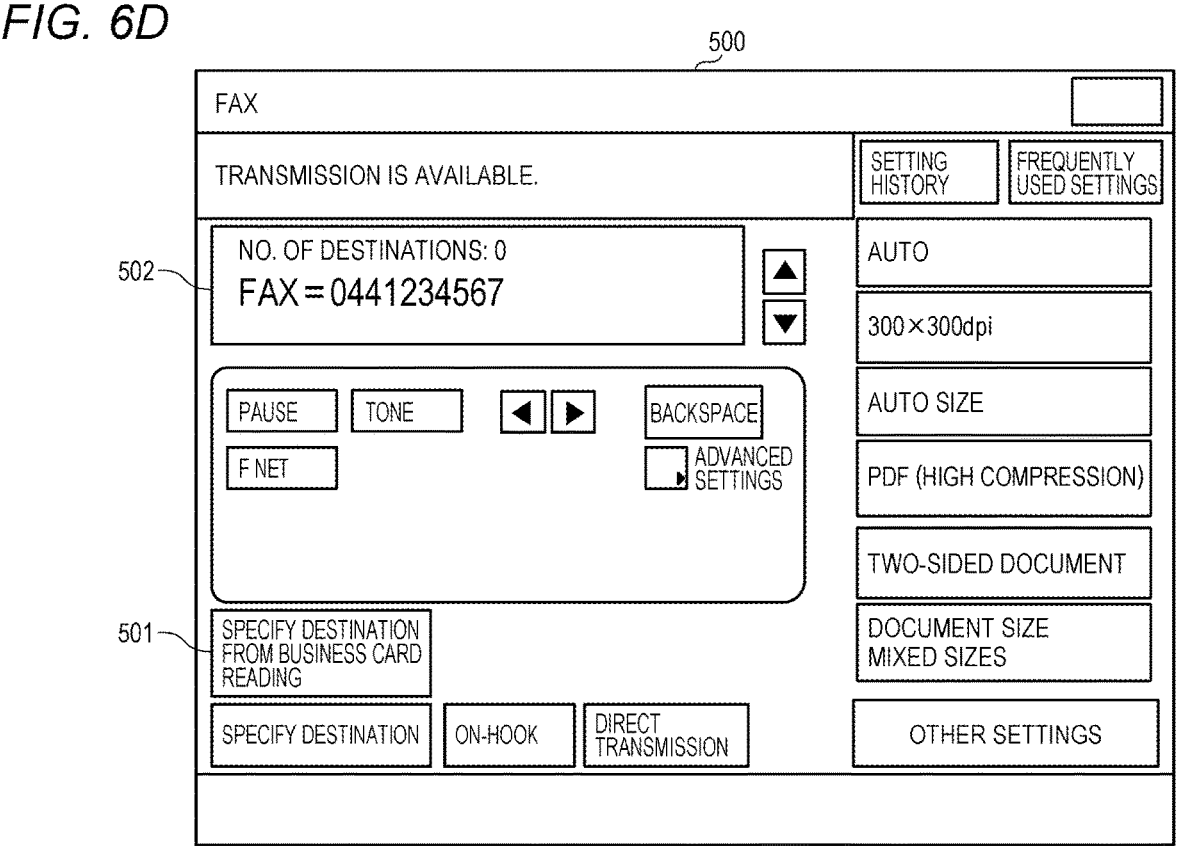

FIG. 6A is a fax window 500.

A button 501 is selected to register a destination read from a business card in the transmission destination 502. In S7000, while the fax window 500 is displayed, display control is performed in the display determination processing of the destination setting from the business card button 501.

Hereinafter, S7000 will be described in detail with reference to FIG. 7C.

First, in S7100, the item 303 of the limitation on new destinations (fax) is checked.

When the item 303 is ON, the process moves to No in S7000 described in FIG. 7A. When the item 303 is OFF, the process moves to S7101.

When it is determined in S7101 that the item 314 of the user access management setting is OFF, the process moves to Yes in S7000 described in FIG. 7A. When the item 314 is ON, the process moves to S7102.

When it is determined in S7102 that the item 312 of the limitation on transmission to new destinations under the user access management settings 314 is ON, the process moves to No in S7000 described in FIG. 7A. When the item 312 is OFF, the process moves to S7103.

When it is determined in S7103 that the item 311 of the restriction on fax transmission under the user access management settings 314 is OFF, the process moves to Yes in S7000 described in FIG. 7A. When the item 311 is ON, the process moves to No in S7000 described in FIG. 7A.

Figure 7B:
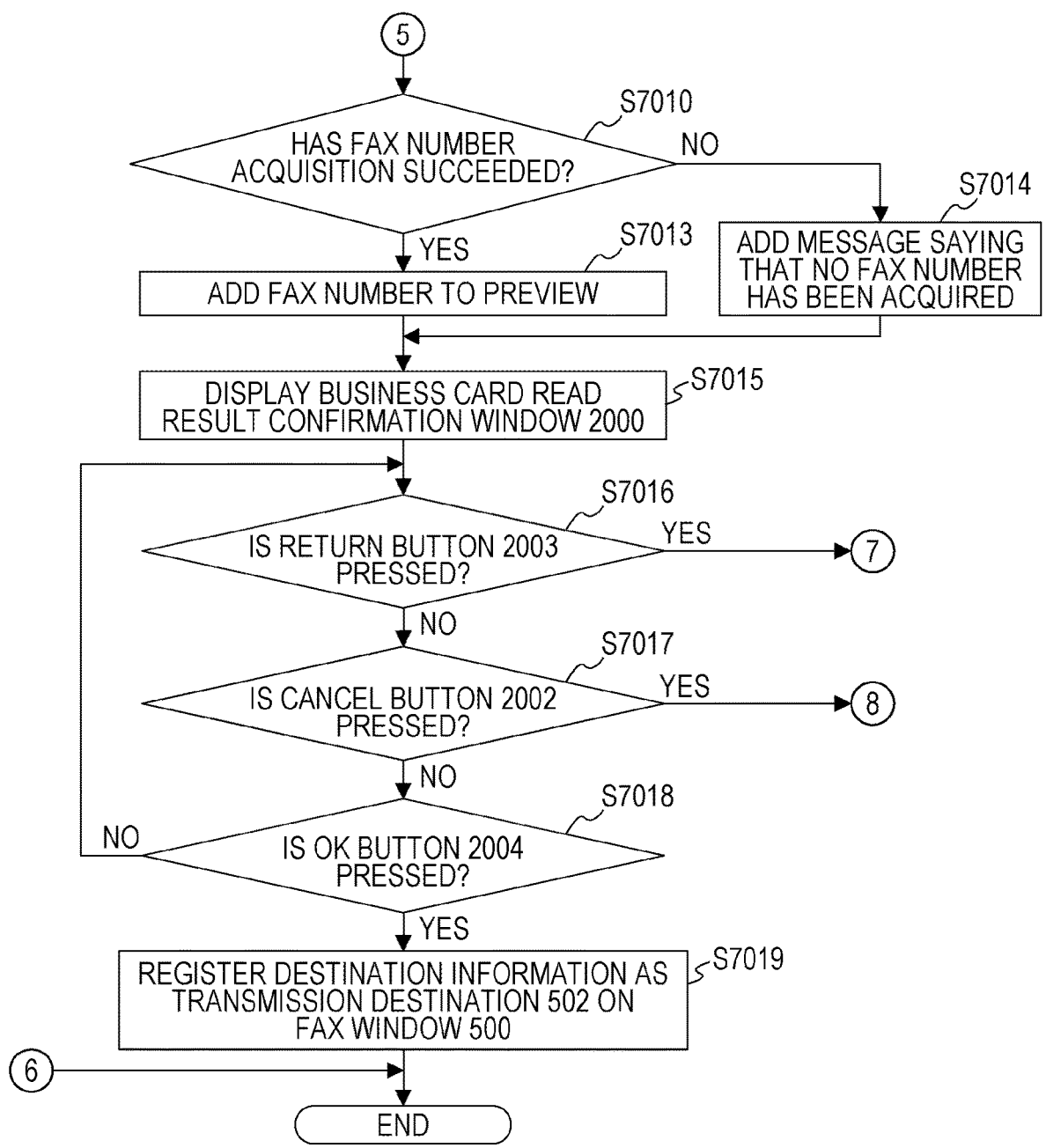
Figure 7C:
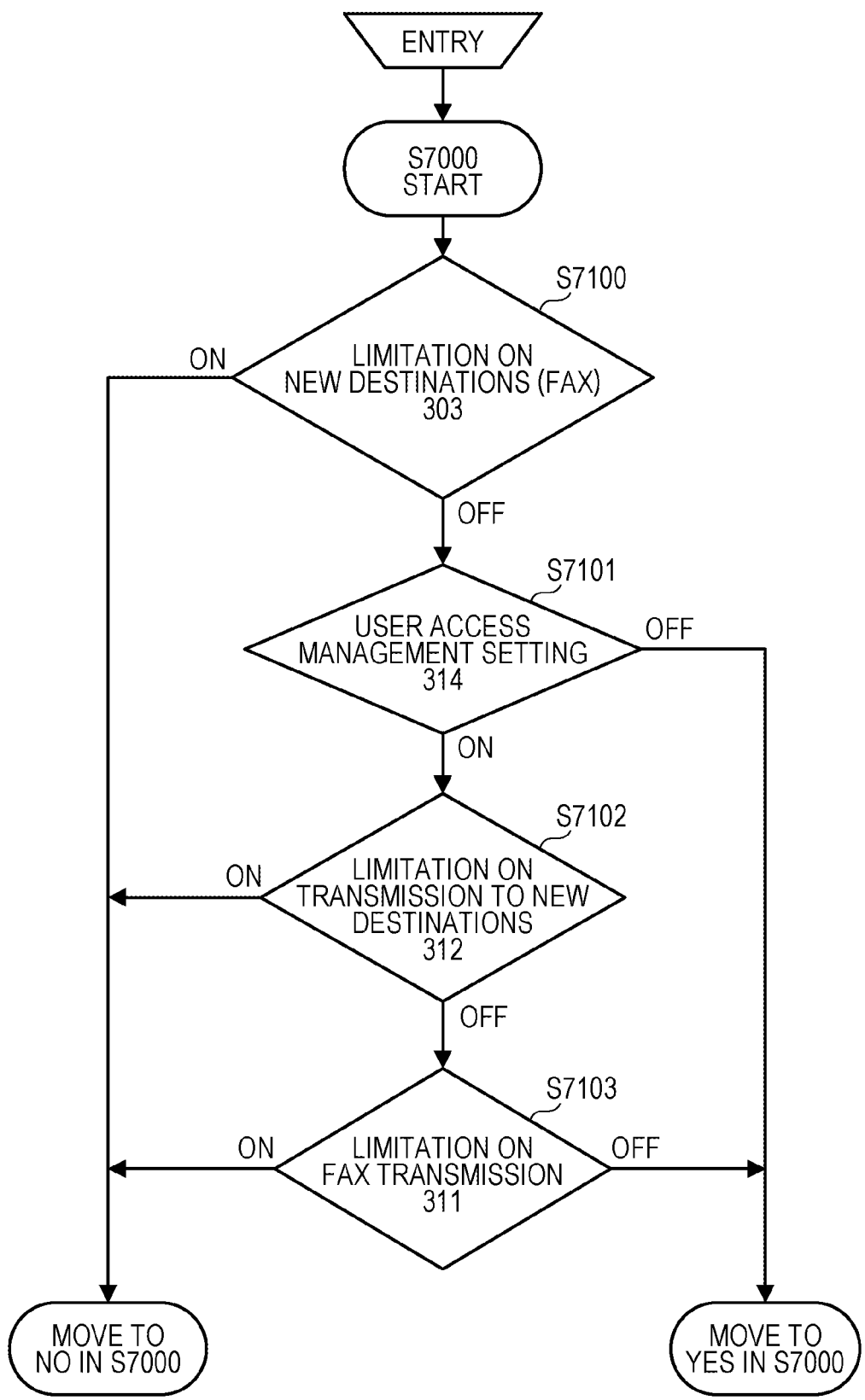
FIG. 7C is a flowchart of the registration of the destination from the business card in the fax function.

In the present example, since all the settings of the limitations related to fax transmission for the user B are OFF, the result of the determination described in FIG. 7C, specifically, S7000 is Yes, and the process moves to S7001.

Next, in S7001 described in FIG. 7A, when the selection of the destination setting from the business card button 501 is detected, the process moves to S7002.

In S7002, the business card read window 1000 is displayed. The business card read window 1000 includes the cancel button 1001. When the cancel button 1001 is selected, the screen returns to the universal transmission window 400.

In S7003, while the business card read window 1000 is displayed, a business card is set on the platen glass.

When the selection of a start key (not illustrated) as a hardware key on the control panel 106 is detected in S7004, the scanner 111 starts to read the image.

In S7005, a business card portion is cut out of the read image to generate a business card image. The cut image is displayed in the business card image preview area 2001 in the business card read result confirmation window 2000. When a plurality of business cards is set on the platen glass at the same time, respective images of the business cards are cut out of the read images (multi-cropping) and the cut business card images are individually processed. In the present example, however, one business card is used as described below.

Next, in S7006, the business card image is subjected to OCR processing.

In S7007, name information is acquired from the extracted character information. The method for acquiring the name portion is the same as that in the first example and thus descriptions thereof will be omitted.

In S7008, the acquired name information is displayed in the name text area 2006 in the business card read result confirmation window 2000. In addition, the image of the name portion is cut out based on coordinate information extracted in the OCR processing, and the cut image is displayed in an enlarged manner in the name confirmation field 2005 in the business card read result confirmation window 2000. This makes it easy for the user to confirm the OCR result.

Next, in S7009, the fax number is acquired. The method for acquiring the fax number is the same as that in the first example and thus descriptions thereof will be omitted.

Then, in S7010, it is determined whether the acquisition of the fax number has succeeded.

When the acquisition has succeeded (Yes), the fax number is displayed in a fax number text area 2010 in the business card read result confirmation window 2000. Then, the image of the fax number portion is cut out based on coordinate information extracted in the OCR processing, and the cut image is displayed in an enlarged manner in a fax number enlarged preview area 2009 in the business card read result confirmation window 2000. When it is determined in S7010 that the acquisition of the fax number has failed, a message to the effect of that is displayed in the business card read result confirmation window 2000 in S7014.

Next, in S7015, the business card read result confirmation window 2000 is displayed.

The business card read result confirmation window 2000 contains the name text edit button 2007. The business card read result confirmation window 2000 also includes a fax number edit button 2011. A check box 2012 is intended to decide whether to register the fax number on display in the transmission destination 502 of the fax window 500. The check box 2012 is provided to cancel the registration of a specific business card while the user checks the business cards one by one when a plurality of business cards is read at the same time. In the present example, however, only one business card is read and thus the check box 2012 may not be displayed.

A cancel button 2002 is intended to stop the processing and return to the fax window 500 (Yes in S7017). A return button 2003 is intended to return to the previous window (Yes in S7016). When a plurality of business cards is scanned at the same time, these business cards are displayed one by one in the business card read result confirmation window 2000. Thus, the return button 2003 is used to return to the previous business card for confirmation. In the present example, only one business card is used and thus selecting the return button 2003 returns the screen to the business card read window 1000.

The OK button 2004 is a button for confirmation, which is displayed when the last business card is displayed. When this button is selected (Yes in S7018), the screen returns to the fax window 500 on which the destination information selected in the business card read result confirmation window 2000 is displayed in the transmission destination display area 502 (S7019).

When the destination information is read from the business card and is registered as a destination of fax function as described above, unusable destination information is set to non-display state to allow the user to know in advance the unusable functions. This saves the user from having to perform useless operations.

Third Example

<Screen Flow of Address Book Registration from a Business Card>

Next, descriptions will be given as to a process flow and screen display of reading destination information from one business card and registering the same in the address book 203 with reference to FIGS. 8A to 8E and 9A to 9G.

In a third example, the settings in FIGS. 3A and 3B are as described in Table 3 below. Specifically, the third example is an example in which the logged-in user is C and the user access management settings 314 for the user C is ON.

As in the foregoing examples, this series of operations is performed when a program describing the following procedure is read from the ROM 102 to the RAM 103 and then is executed by the CPU 101.

TABLE 3

(a) Device settings in the third example

| | |
|---|---|
| Fax function display 300 | ON |
| Fax display in universal transmission function 301 | ON |
| Limitation on new destinations (e-mail) 302 | OFF |
| Limitation on new destinations (fax) 303 | OFF |
| Limit e-mail transmission to user himself/herself 304 | OFF |

(b) User access management settings for logged-in user in the third example

| | User C |
|---|---|
| Limitation on e-mail transmission 310 | ON |
| Limitation on fax transmission 311 | OFF |
| Limitation on transmission to new destinations 312 | OFF |

Figure 8A:
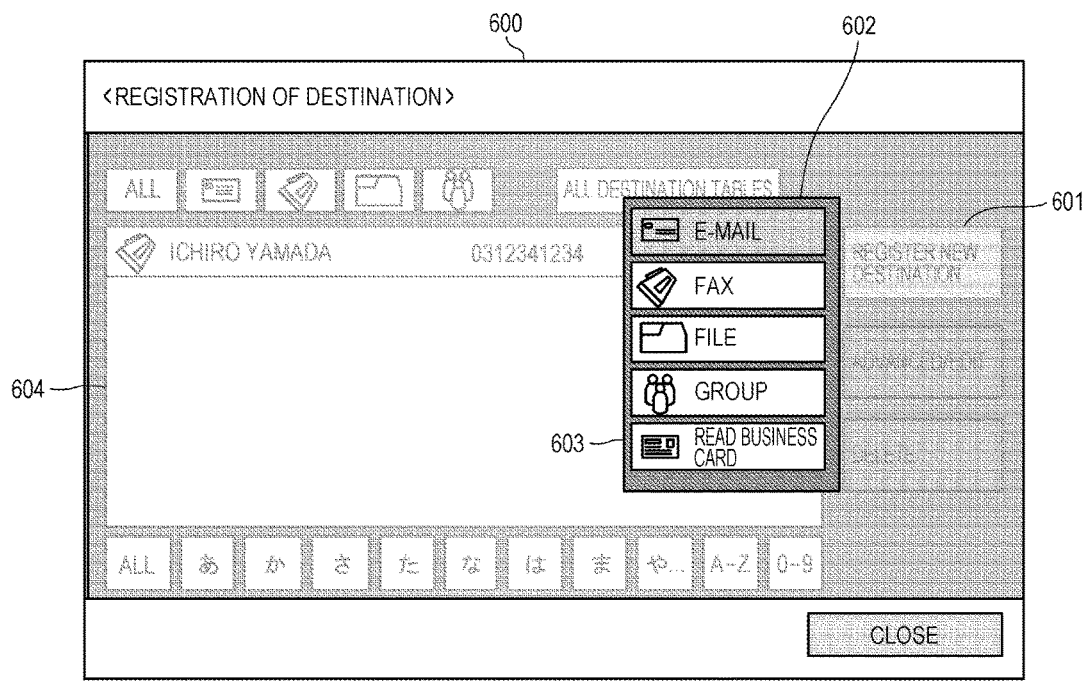
FIGS. 8A and 8B are diagrams describing screen display at the registration of a destination from a business card in an address book.
Figure 8B:
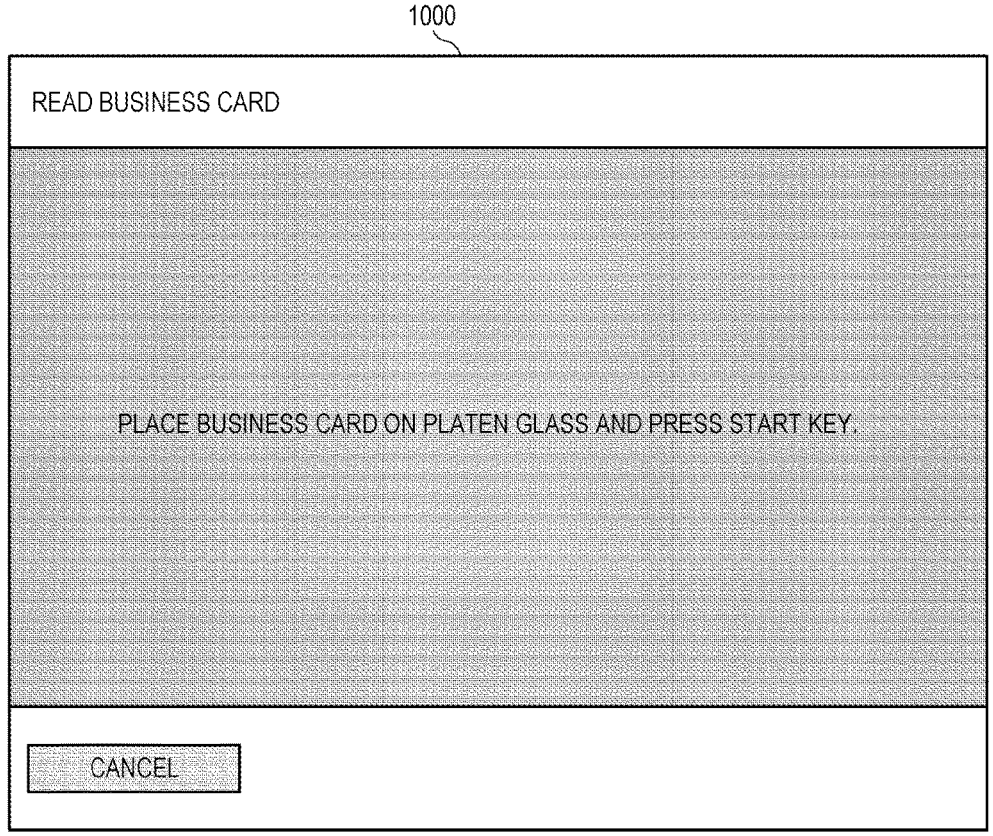

FIG. 8A illustrates an address book registration window 600. A list of already registered destinations is displayed in the display area 604. A button 601 is selected to input a new destination. When the button 601 is selected (S5000 in FIG. 5A), a dialog 602 is displayed in which the transmission functions are selectable. The dialog 602 includes buttons 603 for inputting a destination using a business card read result. The display of the dialog 602 is controlled in the button display determination processing in S9001.

Hereinafter, S9001 will be described in detail with reference to FIG. 9C.

First, in S9100, it is determined whether the registration of a fax destination is available. When the determination result is NO in S9100, the process moves to S9101.

When it is not determined in S9101 that the registration of an e-mail destination is available, the process moves to No in S9001 described in FIG. 9A.

When the determination result in either S9100 or S9101 is Yes, the process moves to Yes in S9001 described in FIG. 9A. Then, S9100 will be described in detail with reference to FIG. 9D, and S9101 will be described in detail with reference to FIG. 9E.

Figure 9B:
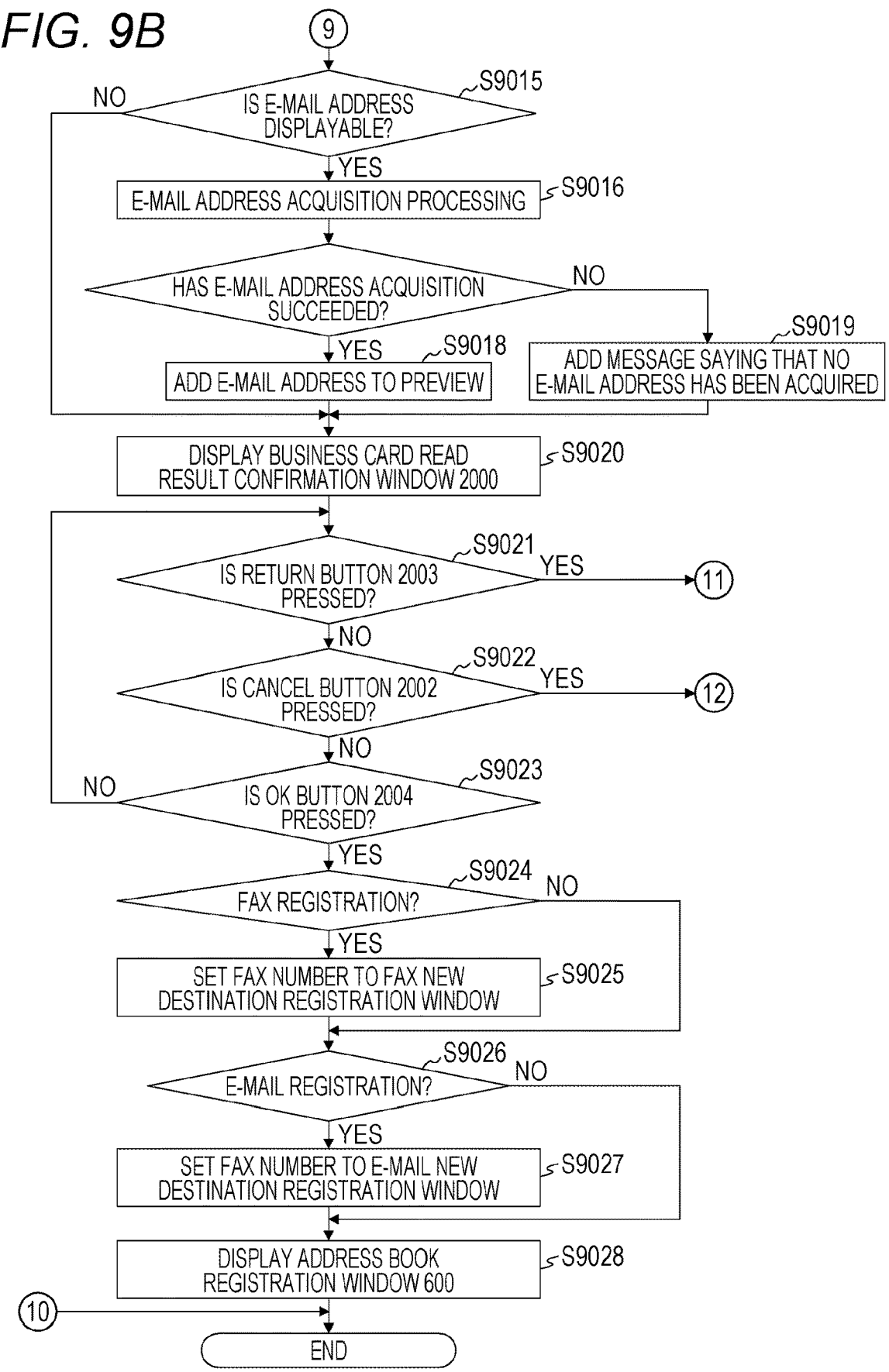
Figure 9C:
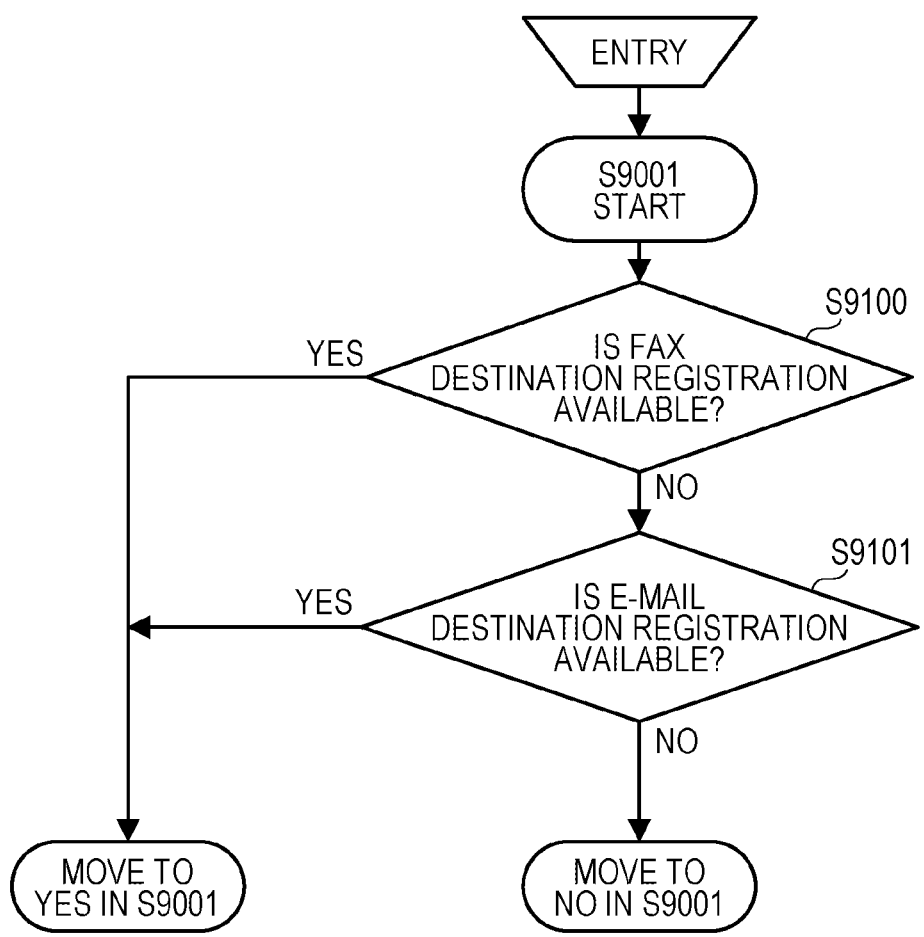
FIGS. 9C and 9D are flowcharts of the registration of the destination from the business card in the address book.
Figure 9D:
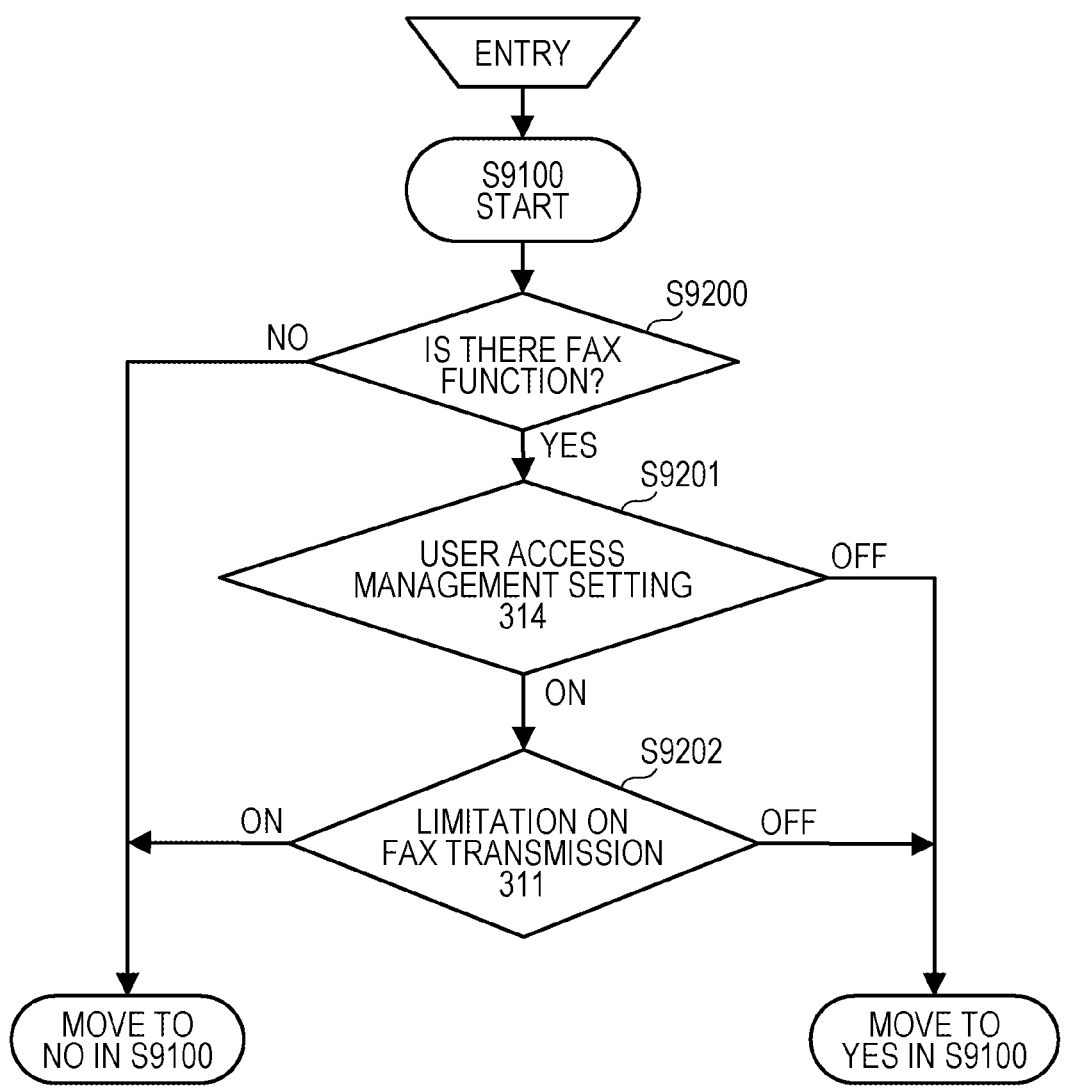

First, S9100 will be described in detail (FIG. 9D).

In S9200, it is determined whether the MFP 100 has a fax function by checking the presence of the MODEM 112 and the NCU 113. This is because the fax function is an option function of the MFP 100 and thus some devices have no fax function.

When it is determined in S9200 that the MFP 100 has no fax function, the process moves to No in S9100 described in FIG. 9C. When the MFP 100 has the fax function, the process moves to S9201.

When it is determined in S9201 that the item 314 of the user access management settings is OFF, the process moves to Yes in S9100 described in FIG. 9C. When the item 314 is ON, the process moves to S9202.

When it is determined in S9202 that the item 311 of the restriction on fax transmission under the user access management settings 314 is OFF, the process moves to Yes in S9100 described in FIG. 9C. When the item 311 is ON, the process moves to No in S9100 described in FIG. 9C.

Figure 9E:
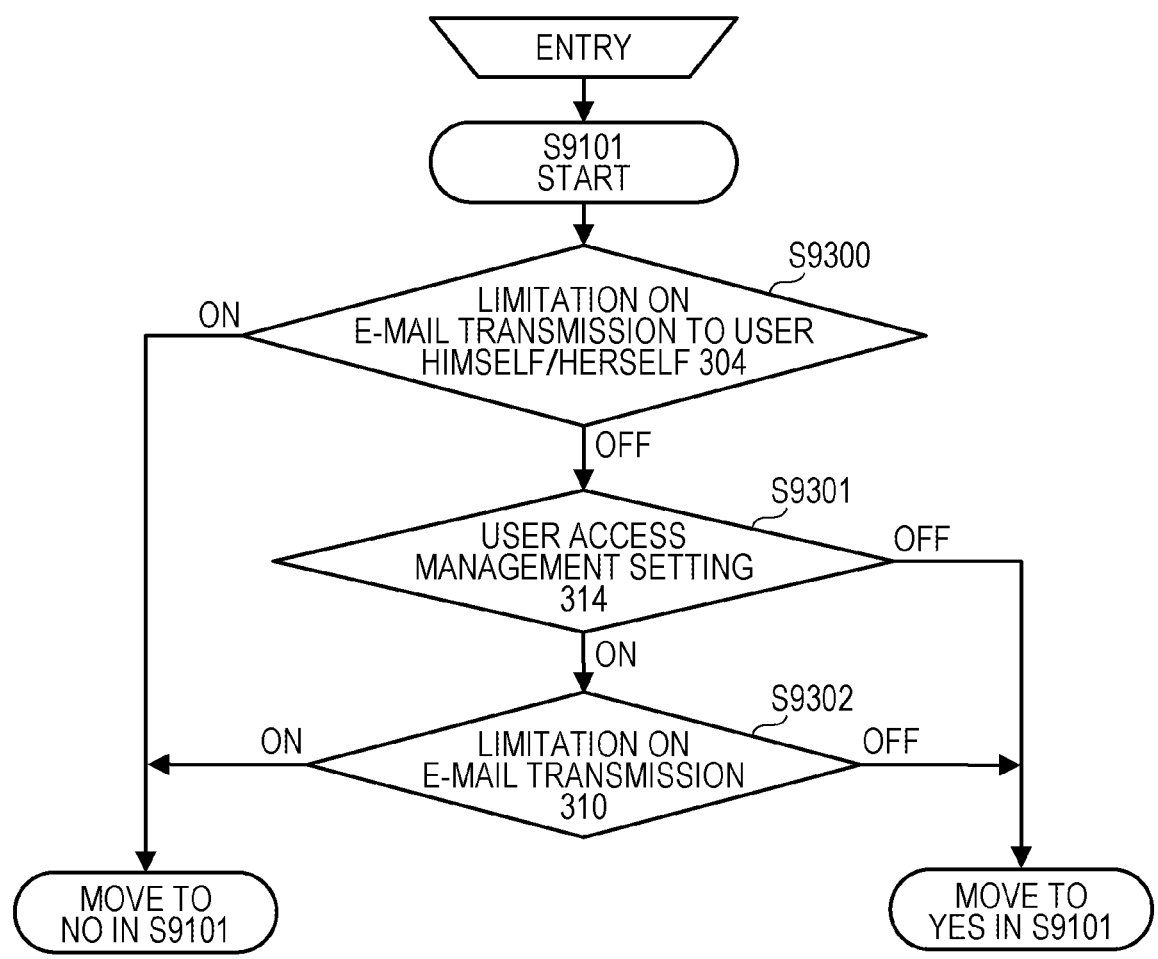
FIGS. 9E to 9G are flowcharts of the registration of the destination from the business card in the address book.
Figure 9F:
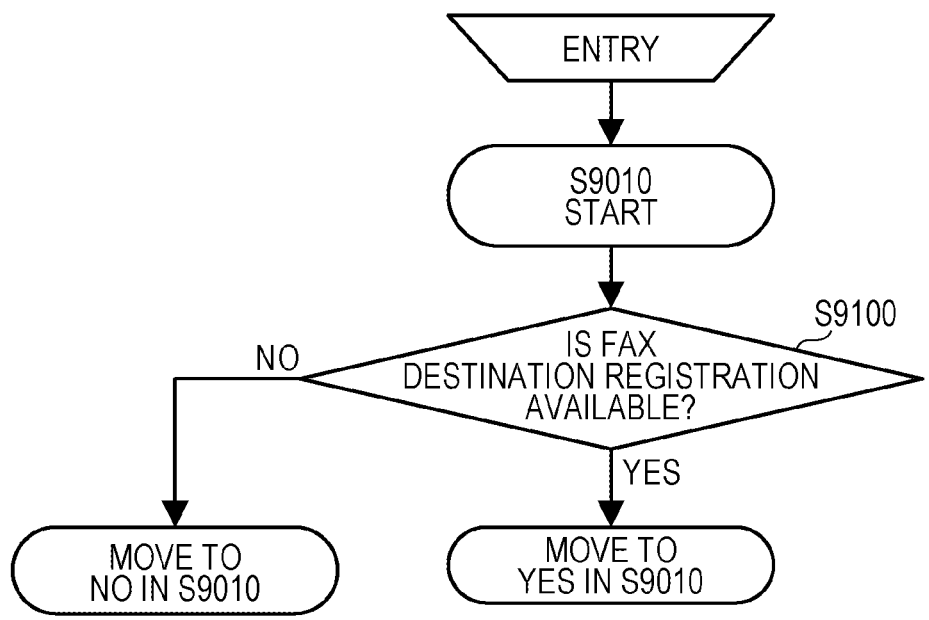
Figure 9G:
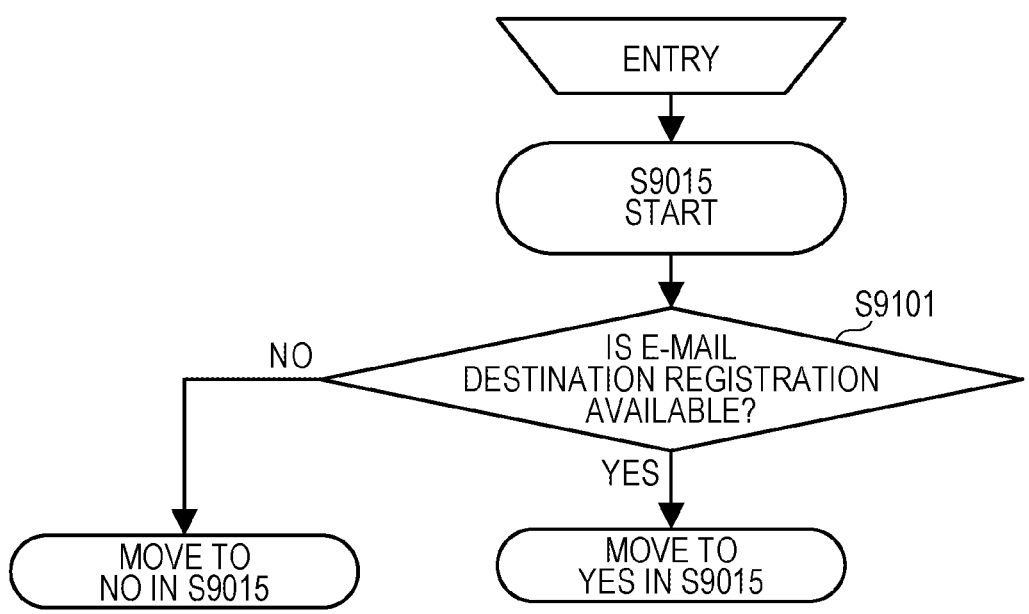

Next, S9101 will be described in detail (FIG. 9E).

First, in S9300, the value of the item 304 of limitation on e-mail transmission to the user himself/herself is checked. When the item 304 is ON, the process moves to No in S9101 described in FIG. 9C. When the item 304 is OFF, the process moves to S9301.

When it is determined in S9301 that the item 314 of the user access management settings is OFF, the process moves to Yes in S9101 described in FIG. 9C. When the item 314 is ON, the process moves to S9302.

When it is determined in S9302 that the item 310 of the restriction on e-mail transmission under the user access management settings 314 is OFF, the process moves to Yes in S9101 described in FIG. 9C. When the item 310 is ON, the process moves to No in S9101 described in FIG. 9C.

In the present example, the limitation on e-mail transmission 310 for the user C is ON, e-mail is not available. However, since all the limitations on fax are OFF, the determination result is Yes in S9001 described in FIG. 9A (display enabled), and the business card read button 603 is displayed in a usable state.

Next, when the selection of the business card read button 603 is detected in S9002 described in FIG. 9A, the process moves to S9003.

In S9003, the business card read window 1000 is displayed. The business card read window 1000 includes the cancel button 1001. When the cancel button 1001 is selected, the screen returns to the universal transmission window 400.

In S9004, while the business card read window 1000 is displayed, a business card is set on the platen glass.

In S9005, when the selection of a start key (not illustrated) as a hardware key on the control panel 106 is detected, the process moves to S9006.

In S9006, the scanner 111 starts image reading. Then, a business card portion from the read image is processed to generate a business card image. The cut image is displayed in the business card image preview area 2001 in the business card read result confirmation window 2000.

When a plurality of business cards is set on the platen glass at the same time, respective images of the business cards are cut out of the read images (multi-cropping) and the cut business card images are individually processed. In the present example, however, one business card is used as described below.

Next, in S9007, the business card image is subjected to OCR processing.

In S9008, name information is acquired from the extracted character information. The method for acquiring the name portion is the same as that in the first example and thus descriptions thereof will be omitted.

In S9009, the acquired name information is displayed in the name text area 2006 in the business card read result confirmation window 2000. In addition, the image of the name portion is cut out based on coordinate information extracted in the OCR processing, and the cut image is displayed in an enlarged manner in the name confirmation field 2005 in the business card read result confirmation window 2000. This makes it easy for the user to confirm the OCR result.

Next, in S9010, it is determined whether to display a preview module of a fax number. In S9010, the determination logic in S9100 is used as described in FIG. 9F.

When the determination result is Yes in S9100, the process moves to Yes in S9010 described in FIG. 9A. When the determination result is No, the process moves to No in S9010 described in FIG. 9A.

In the present example, since all the settings of the limitations related to fax transmission for the user C are OFF, the result of the determination described in S9010 is Yes, and the fax number is acquired.

In this case, next, in S9011, fax number acquisition processing is performed. The method for acquiring the fax number is the same as that in the first example and thus descriptions thereof will be omitted.

In S9012, it is determined whether the acquisition of the fax number has succeeded. When the acquisition has succeeded (Yes), the process moves to S9013.

In S9013, the fax number is displayed in the fax number text area 2010 in the business card read result confirmation window 2000. Then, the image of the fax number portion is cut out based on coordinate information extracted in the OCR processing, and the cut image is displayed in an enlarged manner in the fax number enlarged preview area 2009 in the business card read result confirmation window 2000. When it is determined in S9012 that the acquisition of the fax number has failed, a message to the effect of that (not illustrated in FIG. 8C) is displayed in the business card read result confirmation window 2000.

Next, in S9015, it is determined whether to display a preview module of an e-mail address. In S9015, the determination logic in S9101 is used as described in FIG. 9G. When the determination result is Yes in S9101, the process moves to Yes in S9015 described in FIG. 9B. When the determination result is No, the process moves to No in S9015 described in FIG. 9B.

In the present example, since the limitation on e-mail transmission 310 for the user C is set to ON, the result of the determination described in FIGS. 9A and 9B, specifically, S9015 is No. Therefore, no e-mail address is acquired or displayed in the business card read result confirmation window 2000.

The process flow in the case where the determination result is Yes in S9015 will be described.

In this case, the e-mail address is acquired in S9016. The method for acquiring the e-mail address is the same as that in the first example and thus descriptions thereof will be omitted.

In S9017, it is determined whether the acquisition of the e-mail address has succeeded. When the acquisition has succeeded (Yes), the e-mail address is displayed in the e-mail address text area 2014 in the business card read result confirmation window 2000. Then, the image of the e-mail address portion is cut out based on coordinate information extracted in the OCR processing, and the cut image is displayed in an enlarged manner in an e-mail address enlarged preview area 2013 in the business card read result confirmation window 2000.

When it is determined in S9017 that the acquisition of the e-mail address has failed, a message to the effect of that (not illustrated in FIG. 8C) is displayed in the business card read result confirmation window 2000.

Next, in S9020, the business card read result confirmation window 2000 is displayed. The business card read result confirmation window 2000 contains the name text edit button 2007. When the edit button 2007 is selected, a software keyboard is displayed for the user to edit the text manually. Similarly, the business card read result confirmation window 2000 contains the fax number edit button 2011.

The check box 2012 is used to select whether to register the fax number in the address book. This check box 2012 is mainly provided to, when both the e-mail address and the fax number are to be acquired and displayed, enable selection on whether to use the respective pieces of destination information of the e-mail address and the fax number. Therefore, in the case where only the fax number is to be displayed as in the present example, the check box 2012 may not be displayed.

The cancel button 2002 is intended to stop the processing and return to the address book registration window 600 (Yes in S9022). The return button 2003 is intended to return to the previous window (Yes in S9021). When a plurality of business cards is scanned at the same time, these business cards are displayed one by one in the business card read result confirmation window 2000. Thus, the return button 2003 is used to return to the previous business card for confirmation. In the present example, only one business card is used and thus selecting the return button 2003 returns the screen to the business card read window 1000.

The OK button 2004 is a button for confirmation, which is displayed when the last business card is displayed. When the OK button 2004 is selected (Yes in S9023), the process moves to S9024. In S9024, when the selection of the check box 2008 of the fax number is checked, it is determined that the fax number is to be registered and the process moves to S9025. When the check box 2008 is not checked, the process moves to S9026. In S9025, the fax new destination registration window 2100 is displayed.

The fax new destination registration window 2100 includes a name text display area 2101 where the value of the name text area 2006 in the business card read result confirmation window 2000 is displayed. In the fax new destination registration window 2100, a name edit button 2107 is selectable to allow the registration of furigana of the name.

The value of the fax number text area 2010 in the business card read result confirmation window 2000 is displayed in the fax number display area 2102. The fax number is not edited in this window, and thus the fax number display area 2102 is displayed in an editing disabled state.

Reference sign 2103 represents a destination table selection pulldown, and 2104 an advanced settings button. When the advanced settings button 2104 is selected, the screen moves to a window for line selection and F cord and password setting (not illustrated).

A cancel button 2105 is used to stop the processing and return to the previous window. When the OK button 2106 is selected, the fax destination is registered as it is set in the address book 203 and the process moves to S9026.

Figure 8C:
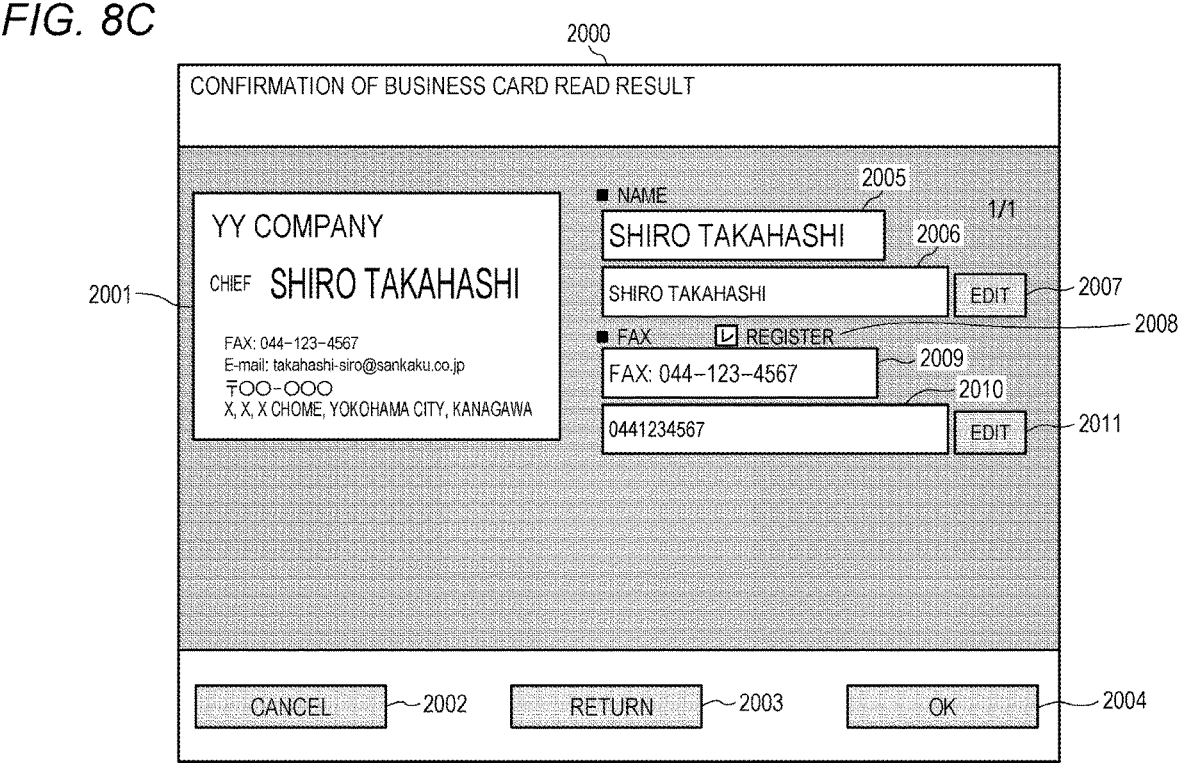
FIGS. 8C and 8D are diagrams describing screen display at the registration of the destination from the business card in the address book.
Figure 8D:
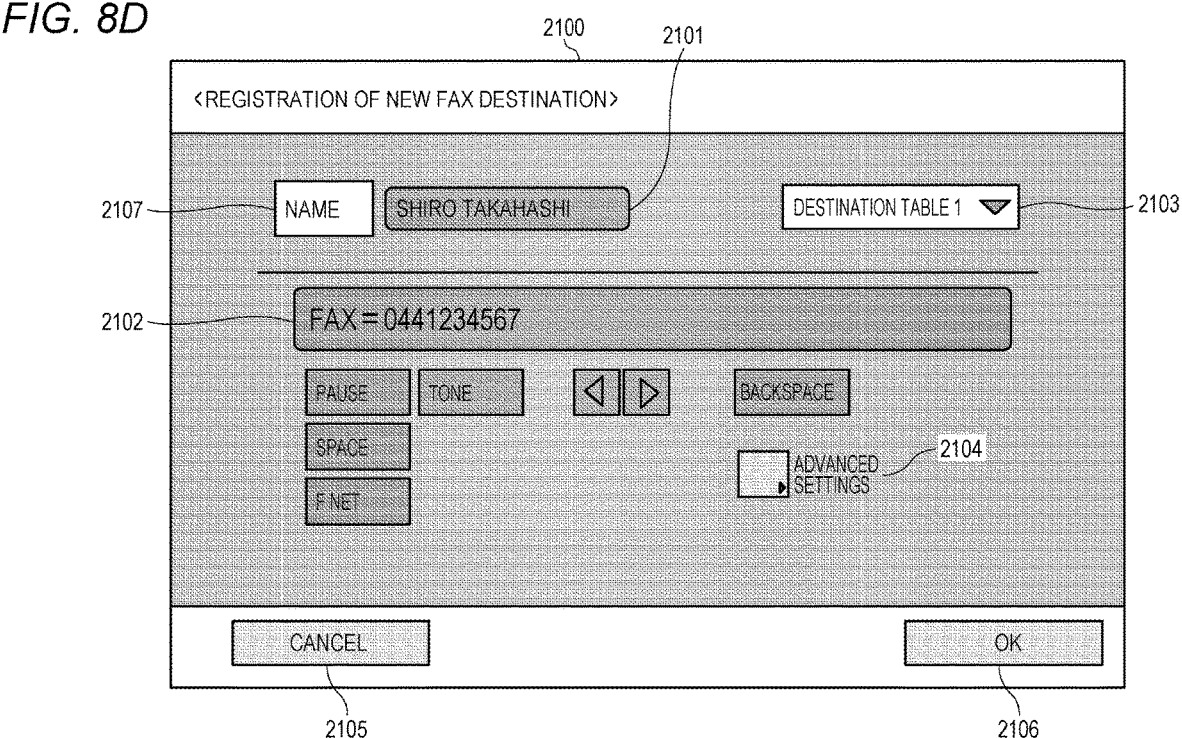
Figure 8E:
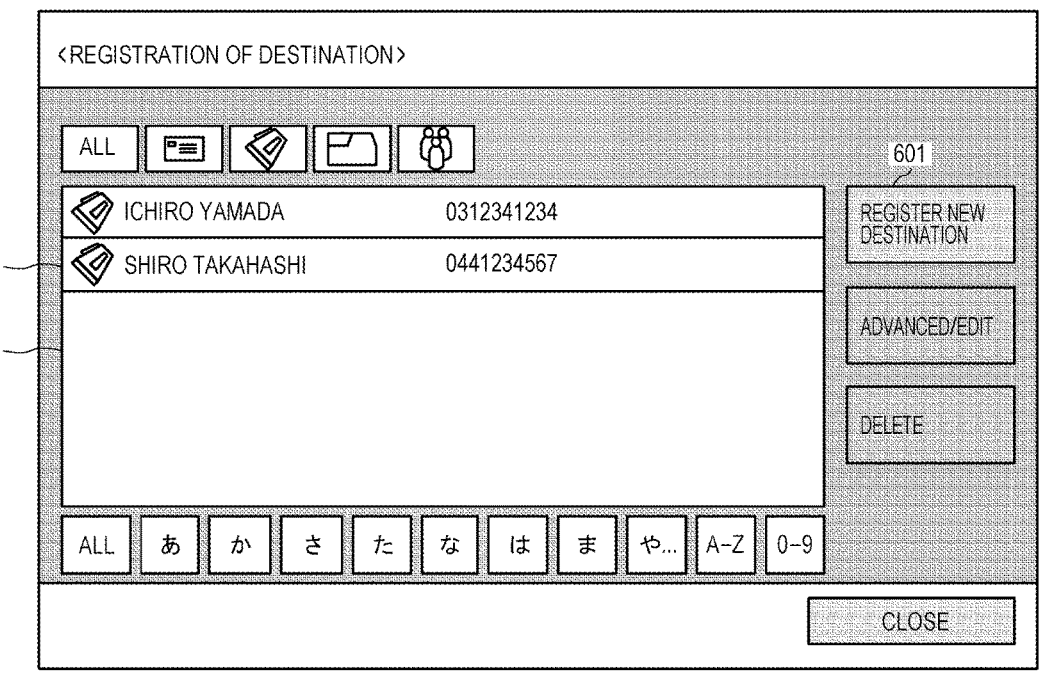
FIG. 8E is a diagram describing screen display at the registration of the destination from the business card in the address book.

In S9026, the selection of the e-mail address registration check box is checked although it is not displayed in FIG. 8C in the present example. When the check box is checked, it is determined that the e-mail address is to be registered and the process moves to S9027. When the check box is not checked, the process moves to S9028.

In S9027, an e-mail address new destination registration window (not illustrated) is displayed. In the e-mail address new destination registration window, an e-mail address can be registered in the address book 203 based on the value of the name text area 2006 and the value of the e-mail address text area 2014 in the business card read result confirmation window 2000.

Finally, the process moves to S9028 and the address book registration window 600 is displayed, and the processing is terminated. A destination 605 added in this flow is displayable in the registered destination display area 604.

When the destination information is read from the business card and is registered in the address book as described above, unusable destination information is set to non-display state to allow the user to know in advance the unusable functions. This saves the user from having to perform useless operations.

The "business card" in the present disclosure is not limited to a business card in a narrow sense but can be any business form or an address table that is a medium that destination information, such as fax number or e-mail address, is displayed/included.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-242958, filed Dec. 19, 2017, which is hereby incorporated by reference herein in its entirety.

What is claimed is:

1. An image processing apparatus which is able to transmit image data by a plurality of transmission protocols, comprising:
   a reader that reads a-one document and generates image data;
   a processor that performs character recognition on the generated image data and is able to obtain a plurality of pieces of destination information based on a result of the character recognition; and
   a display that displays the plurality of pieces of destination information obtained by the processor as candidates of transmission destinations,
   wherein the processor sets, as a transmission destination, a piece of destination information selected by a user from the plurality of pieces of destination information displayed by the display,
   wherein the image processing apparatus transmits image data based on the set piece of destination information,
   wherein the processor is able to set restriction on transmission by a transmission protocol included in the plurality of transmission protocols, and
   wherein, in a case where the processor obtains a first piece of destination information of a first transmission protocol by which transmission is not restricted and a second piece of destination information of a second transmission protocol by which transmission is restricted, the display displays the first piece of destination information without displaying the second piece of destination information.

2. The image processing apparatus according to claim 1, wherein the plurality of transmission protocols include a facsimile protocol.

3. The image processing apparatus according to claim 1, wherein the plurality of pieces of destination information include a facsimile number.

4. The image processing apparatus according to claim 1, wherein the plurality of transmission protocols include an e-mail protocol.

5. The image processing apparatus according to claim 1, wherein the plurality of pieces of destination information include an e-mail address.

6. The image processing apparatus according to claim 1, wherein the document is a business card.

7. The image processing apparatus according to claim 1, wherein the processor is able to set to restrict transmission by the transmission protocol for each user.

8. The image processing apparatus according to claim 1, wherein the processor is able to set to restrict transmission by the transmission protocol as a setting of the image processing apparatus.

9. The image reader according to claim 1, further comprising:
a printer.

10. A method for setting destination information in an image processing apparatus which is able to transmit image data by a plurality of transmission protocols, the method comprising:
reading one document and generating image data;
performing character recognition on the generated image data and obtaining a plurality of pieces of destination information based on a result of the character recognition;
displaying the plurality of pieces of obtained destination information as candidates of transmission destinations;
setting, as a transmission destination, a piece of destination information selected by a user from the plurality of pieces of displayed destination information; and
transmitting image data based on the set piece of destination information,
wherein restriction on transmission by a transmission protocol included in the plurality of transmission protocols is able to be set, and
wherein, in a case where a first piece of destination information of a first transmission protocol by which transmission is not restricted and a second piece of destination information of a second transmission protocol by which transmission is restricted are obtained, the first piece of destination information is displayed without displaying the second piece of destination information.

11. A non-transitory computer readable storage medium storing a program for causing a computer to execute a method for setting destination information in an image processing apparatus which is able to transmit image data by a plurality of transmission protocols, the method comprising:
reading one document and generating image data;
performing character recognition on the generated image data and obtaining a plurality of pieces of destination information based on a result of the character recognition;
displaying the plurality of pieces of obtained destination information as candidates of transmission destinations;
setting, as a transmission destination, a piece of destination information selected by a user from the plurality of pieces of displayed destination information; and
transmitting image data based on the set piece of destination information,
wherein restriction on transmission by a transmission protocol included in the plurality of transmission protocols is able to be set, and
wherein, in a case where a first piece of destination information of a first transmission protocol by which transmission is not restricted and a second piece of destination information of a second transmission protocol by which transmission is restricted are obtained, the first piece of destination information is displayed without displaying the second piece of destination information.

12. The image processing apparatus according to claim 1, wherein the processor is able to set the piece of destination information selected by the user as the transmission destination based on a setting instruction by the user.

13. The image processing apparatus according to claim 12, wherein the displayed plurality of destination information is able to be edited by a user.

* * * * *